United States Patent
Takahashi et al.

(10) Patent No.: US 11,394,757 B2
(45) Date of Patent: Jul. 19, 2022

(54) COMMUNICATION TERMINAL, COMMUNICATION SYSTEM, AND METHOD OF SHARING DATA

(71) Applicants: Kazunobu Takahashi, Kanagawa (JP); Hiroshi Hinohara, Kanagawa (JP); Takeshi Homma, Kanagawa (JP); Atsushi Miyamoto, Kanagawa (JP); Shigeru Nakamura, Kanagawa (JP); Yuichi Kawasaki, Kanagawa (JP); Masashi Ogasawara, Tokyo (JP)

(72) Inventors: Kazunobu Takahashi, Kanagawa (JP); Hiroshi Hinohara, Kanagawa (JP); Takeshi Homma, Kanagawa (JP); Atsushi Miyamoto, Kanagawa (JP); Shigeru Nakamura, Kanagawa (JP); Yuichi Kawasaki, Kanagawa (JP); Masashi Ogasawara, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 17/030,399

(22) Filed: Sep. 24, 2020

(65) Prior Publication Data
US 2021/0092170 A1 Mar. 25, 2021

(30) Foreign Application Priority Data
Sep. 25, 2019 (JP) .............................. JP2019-173759

(51) Int. Cl.
*H04L 12/00* (2006.01)
*H04L 65/401* (2022.01)
(Continued)

(52) U.S. Cl.
CPC ........ *H04L 65/4015* (2013.01); *G06F 3/0481* (2013.01); *G06F 3/04842* (2013.01); *G06F 3/1454* (2013.01)

(58) Field of Classification Search
CPC .. G06F 3/0481; G06F 3/04842; G06F 3/1454; G06F 3/1462; G06F 3/0488;
(Continued)

(56) References Cited

U.S. PATENT DOCUMENTS 10,437,549 B2 * 10/2019 Deenadayal ............ G06T 5/002
10,606,438 B2 * 3/2020 Jones ..................... G06Q 10/10
(Continued)

FOREIGN PATENT DOCUMENTS

| JP | 2011-254453 | 12/2011 |
|----|-------------|---------|
| JP | 2014-056454 | 3/2014  |

(Continued)

OTHER PUBLICATIONS

U.S. Appl. No. 16/808,411, filed Mar. 4, 2020 Takeshi Horiuchi, et al.
(Continued)

*Primary Examiner* — Frantz Coby
(74) *Attorney, Agent, or Firm* — Xsensus LLP

(57) ABSTRACT

A communication terminal comprising circuitry to: receive selection of screen data, from among one or more items of screen data, as sharing target data to be shared with other communication terminal, each screen data to be used for generating a display screen and having been generated at the communication terminal; and share the sharing target data with the other communication terminal.

13 Claims, 28 Drawing Sheets

(51) Int. Cl.
*G06F 3/14* (2006.01)
*G06F 3/04842* (2022.01)
*G06F 3/0481* (2022.01)

(58) Field of Classification Search
CPC .............. H04L 65/1069; H04L 65/403; H04L 65/4015; G09G 2350/00; G09G 2358/00; G09G 2340/12
USPC ................ 709/204, 248; 715/741, 747, 753; 719/329
See application file for complete search history.

(56) References Cited

U.S. PATENT DOCUMENTS

| | | | |
|---|---|---|---|
| 10,963,630 B1* | 3/2021 | Sharifi | G06V 30/416 |
| 2007/0124503 A1* | 5/2007 | Ramos | G06F 3/038 |
| | | | 709/248 |
| 2010/0199191 A1* | 8/2010 | Takahashi | G06F 3/0481 |
| | | | 715/741 |
| 2011/0004888 A1* | 1/2011 | Srinivasan | G06F 9/452 |
| | | | 719/329 |
| 2012/0011451 A1* | 1/2012 | Bansal | H04N 7/15 |
| | | | 715/753 |
| 2013/0038676 A1 | 2/2013 | Tanaka et al. | |
| 2013/0290863 A1* | 10/2013 | Chen | G06F 3/0481 |
| | | | 715/747 |
| 2014/0074932 A1 | 3/2014 | Mihara et al. | |
| 2015/0170326 A1 | 6/2015 | Tanaka et al. | |
| 2016/0316173 A1 | 10/2016 | Tanaka et al. | |
| 2016/0321025 A1* | 11/2016 | Ikeda | H04L 65/4015 |
| 2018/0007317 A1 | 1/2018 | Tanaka et al. | |
| 2019/0089928 A1 | 3/2019 | Tanaka et al. | |
| 2020/0026485 A1* | 1/2020 | Deenadayal | G06F 3/1454 |
| 2020/0045265 A1 | 2/2020 | Tanaka et al. | |
| 2020/0177742 A1 | 6/2020 | Homma et al. | |
| 2020/0278823 A1 | 9/2020 | Kawasaki et al. | |

FOREIGN PATENT DOCUMENTS

| | | |
|---|---|---|
| JP | 2015-070543 | 4/2015 |
| JP | 2017-130202 | 7/2017 |
| JP | 2018-136828 | 8/2018 |

OTHER PUBLICATIONS

U.S. Appl. No. 16/816,260, filed Mar. 12, 2020 Hiroshi Hinohara, et al.

* cited by examiner

FIG. 8A

| TERMINAL ID | PASSWORD |
|---|---|
| 01aa | aaaa |
| 01ba | baba |
| 01ca | caca |
| ... | ... |

FIG. 8B

| TERMINAL ID | DESTINATION NAME | OPERATING STATUS | TIME AND DATE OF RECEPTION | IP ADDRESS OF TERMINAL |
|---|---|---|---|---|
| 01aa | TERMINAL AA, TOKYO OFFICE, JAPAN | ONLINE (READY) | 2019.2.10.13.40 | 1.2.1.3 |
| 01ab | MR. AB, TOKYO OFFICE, JAPAN | ONLINE (COMMUICATING) | 2019.2.09.12.00 | 1.2.1.4 |
| 01ac | MR. AC, TOKYO OFFICE, JAPAN | OFFLINE | 2019.2.09.12.30 | 1.2.1.5 |
| ... | ... | ... | ... | ... |
| 01ba | TERMINAL BA, BEIJING OFFICE, CHINA | ONLINE (COMMUICATING) | 2019.2.10.13.45 | 1.2.2.3 |
| 01bb | MR. BB, BEIJING OFFICE, CHINA | ONLINE (SUSPENDED) | 2019.2.10.13.50 | 1.2.2.4 |
| ... | ... | ... | ... | ... |
| 01ca | TERMINAL CA, WASHINGTON, D.C. OFFICE, USA | OFFLINE | 2019.2.10.12.45 | 1.3.1.3 |
| 01cb | MR. CB, WASHINGTON, D.C. OFFICE, USA | ONLINE (COMMUICATING) | 2019.2.10.13.55 | 1.3.1.4 |
| ... | ... | ... | ... | ... |
| 01da | TERMINAL DA, BERLIN OFFICE, EUROPE | ONLINE (COMMUICATING) | 2019.2.08.12.45 | 1.3.2.3 |
| 01db | MR. DB, BERLIN OFFICE, EUROPE | ONLINE (COMMUICATING) | 2019.2.10.12.45 | 1.3.2.4 |
| ... | ... | ... | ... | ... |

FIG. 9A

| SOURCE TERMINAL ID | DESTINATION TERMINAL ID |
|---|---|
| 01aa | 01ab, ..., 01ba, 01bb, ..., 01ca, 01cb, 01da, 01db, ... |
| 01ab | 01aa, 01ca, 01cb, 01da |
| ... | ... |
| 01ba | 01aa, 01ab, 01ca, 01cb, 01da, 01db |
| ... | ... |
| 01ca | 01aa, 01ab, 01ba, ..., 01cb, ..., 01db |

FIG. 9B

| SESSION ID | RELAY DEVICE ID | SOURCE TERMINAL ID | DESTINATION TERMINAL ID | DELAY TIME | TIME AND DATE OF DELAY INFORMATION RECEPTION |
|---|---|---|---|---|---|
| se01 | 111a | 01aa | 01db | 200 | 2019.2.10.13:41 |
| se02 | 111a | 01ba | 01cb | 50 | 2019.2.10.12:01 |
| ... | ... | ... | ... | ... | ... |

FIG. 9C

| RELAY DEVICE ID | OPERATING STATUS | TIME AND DATE OF RECEPTION | IP ADDRESS OF RELAY DEVICE | MAXIMUM DATA TRANSMISSION RATE(Mbps) |
|---|---|---|---|---|
| 111a | ONLINE | 2019.2.10.13:00 | 1.2.1.2 | 100 |
| 111b | OFFLINE | 2019.2.10.13:10 | 1.2.2.2 | 1000 |
| 111c | ONLINE | 2019.2.10.13:20 | 1.3.1.2 | 100 |
| 111d | ONLINE | 2019.2.10.13:30 | 1.3.2.2 | 10 |

FIG. 10

SESSION ID ; se02

| SESSION ID ; se01 | | | |
|---|---|---|---|
| ID | SEQUENCE NUMBER | BODY | PARENT |
| se01 | 1 | children : pag01, pag02, pag03<br>current page : pag03 | – |
| pag01 | 2 | IMAGE DATA URL ; http://XXX.jpeg | se01 |
| sr001 | 3 | COLOR(RGBA) : (0,0,0,0)<br>WIDTH(px) : 10px<br>VERTEX(x,y) : (0,0), (10,0), (20,1), (30,10) | pag01 |
| sr002 | 4 | COLOR(RGBA) : (128,0,0,0)<br>WIDTH(px) : 14px<br>VERTEX(x,y) : (10,50), (15,55), (16,40) | pag01 |
| ... | ... | ... | ... |
| pag02 | 12 | – | se01 |
| sr010 | 13 | COLOR(RGBA) : (255,255,255,0)<br>WIDTH(px) : 10px<br>VERTEX(x,y) : (100,20), (110,30), (11,40) | pag02 |
| ... | ... | ... | ... |
| pag03 | 27 | IMAGE DATA URL ; http://YYY.jpeg | se01 |
| sr024 | 28 | COLOR(RGBA) : (255,255,128,0)<br>WIDTH(px) : 13px<br>VERTEX(x,y) : (57,60), (123,43) | pag03 |
| ... | ... | ... | ... |

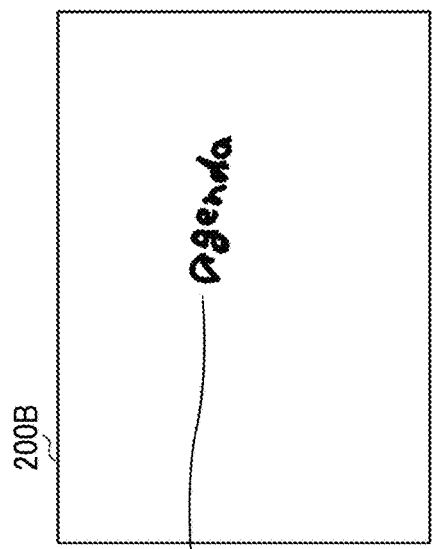
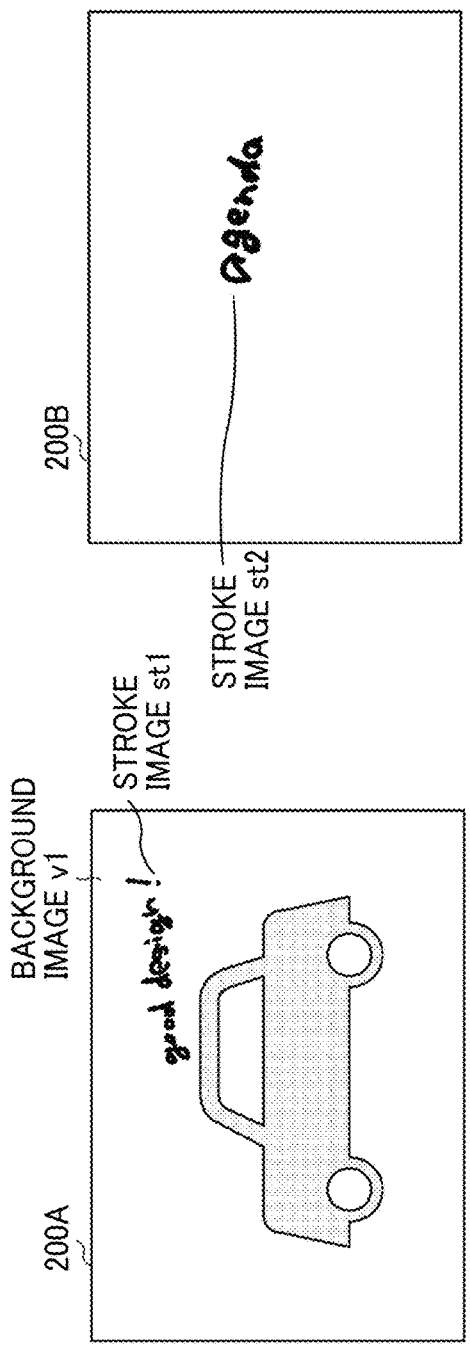
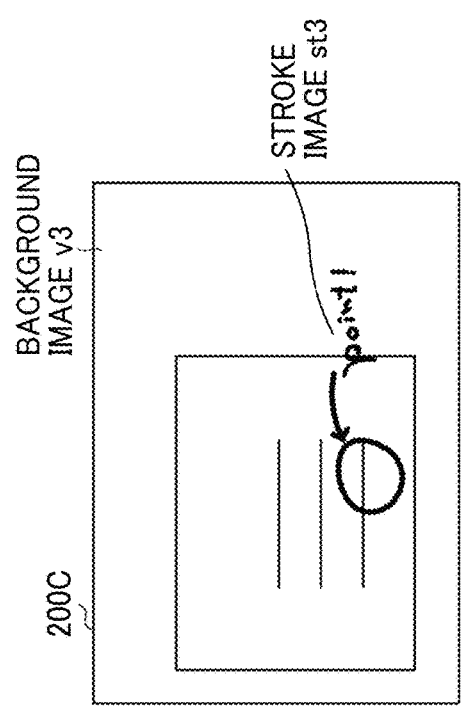

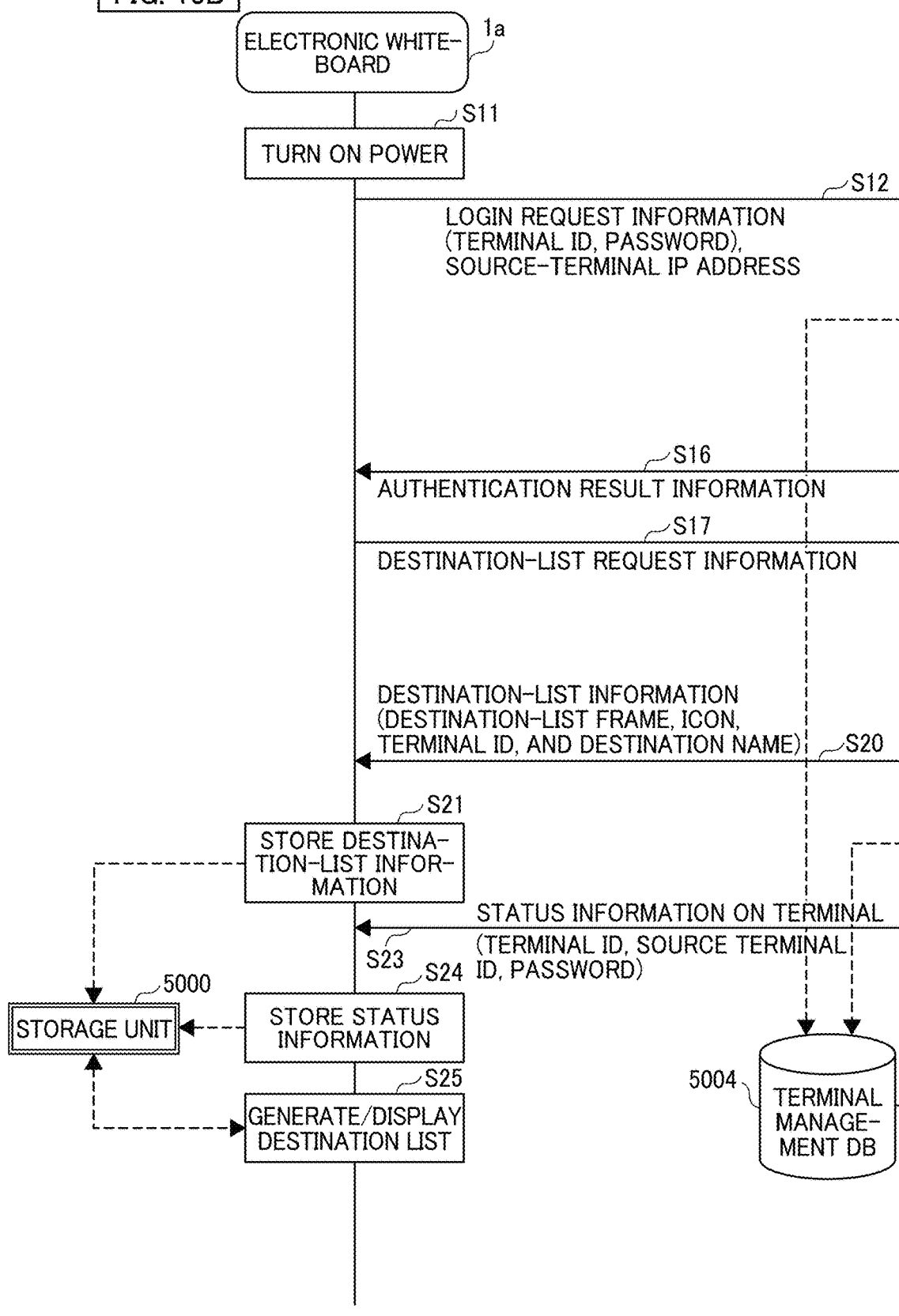

FIG. 14

| STATUS | TERMINAL ID | DESTINATION NAME |
|---|---|---|
| 📞 | 01ab | MR. AB, TOKYO OFFICE, JAPAN |
| 📞 | 01ac | MR. AC, TOKYO OFFICE, JAPAN |
| ⋮ | | |
| 📞 | 01db | MR. DB, BERLIN OFFICE, EUROPE |
| ⋮ | | |

COMMUNICATION TERMINAL, COMMUNICATION SYSTEM, AND METHOD OF SHARING DATA

CROSS-REFERENCE TO RELATED APPLICATIONS

This patent application is based on and claims priority pursuant to 35 U.S.C. § 119(a) to Japanese Patent Application No. 2019-173759, filed on Sep. 25, 2019, in the Japan Patent Office, the entire disclosure of which is hereby incorporated by reference herein.

BACKGROUND

Technical Field

The present disclosure relates to a communication terminal, a communication system, and a method of sharing data.

Discussion of the Background Art

Communication systems are now in widespread use, which allows communication terminals at remote locations to communicate through a communication network such as the Internet. Examples of the communication systems include a conference system that performs a video conference. In general, a communication terminal operated by one party in the video conference transmits image data being held or displayed at the communication terminal to other communication terminal operated by other party through a communication network, to cause the image data and audio data to be shared between the communication terminals. This enables to carry out a video conference between remote locations, in a state close to an actual conference.

Furthermore, in recent years, communication terminals such as electronic whiteboards are widely used in companies, educational institutions, or government institutions. The electronic whiteboards display an image on a display and allows users to draw stroke images such as text, numbers, figures, or the like on the image. The communication terminal electronically converts content drawn through a user operation of touching and moving an electronic pen or the user's hand on a surface of a display of the communication terminal, to generate stroke data such as coordinate data. The stroke image is rendered based on the stroke data. When a stroke image is drawn on one communication terminal, stroke data for reproducing the stroke image is transmitted to the other communication terminal through a communication network. The other communication terminal displays the same stroke image based on the received stroke data.

The techniques described above enable one communication terminal to transmit stroke data for generating a stroke image as well as image data of documents such as documents (e.g., slides for presentation) that are stored in the communication terminal or that are currently being displayed at the communication terminal through a communication network. The other communication terminal on the receiving side displays an image such as an image of materials or a screen background as well as the stroke image.

SUMMARY

Example embodiments include a communication terminal including circuitry to: receive selection of screen data, from among one or more items of screen data, as sharing target data to be shared with other communication terminal, each screen data to be used for generating a display screen and having been generated at the communication terminal; and share the sharing target data with the other communication terminal.

Example embodiments include a communication system including: first circuitry, residing on a first communication terminal, to receive selection of screen data, from among one or more items of screen data, as sharing target data to be shared with a second communication terminal, each screen data to be used for generating a drawing screen and having been generated at the first communication terminal; and second circuitry, residing on the second communication terminal, configured to receive selection of screen data, from among one or more items of screen data, as sharing target data to be shared with the first communication terminal, each screen data to be used for generating a drawing screen and having been generated at the second communication terminal. The sharing target data of the first communication terminal and the sharing target data of the second communication terminal are shared between the first communication terminal and the second communication terminal.

Example embodiments include a method of sharing data, performed by the communication terminal.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8A is a conceptual diagram illustrating an example of an authentication management table, according to the embodiment;

FIG. 8B is a conceptual diagram illustrating an example of a terminal management table, according to the embodiment;

FIG. 9A is a conceptual diagram illustrating an example of a destination list management table, according to the embodiment;

FIG. 9B is a conceptual diagram illustrating an example of a session management table, according to the embodiment;

FIG. 9C is a conceptual diagram illustrating an example of a relay device management table, according to the embodiment;

FIG. 10 is a conceptual diagram illustrating an example of a drawing screen information management table, according to the embodiment;

FIGS. 12A to 12C are diagrams each illustrating an example of a drawing screen displayed on the electronic whiteboard, according to the embodiment;

FIGS. 13A and 13B (FIG. 13) are a sequence diagram illustrating operation for preparing to start remote communication between electronic whiteboards, according to an embodiment;

FIG. 14 is a diagram illustrating an example of a destination list screen displayed on the electronic whiteboard;

Figure 1:
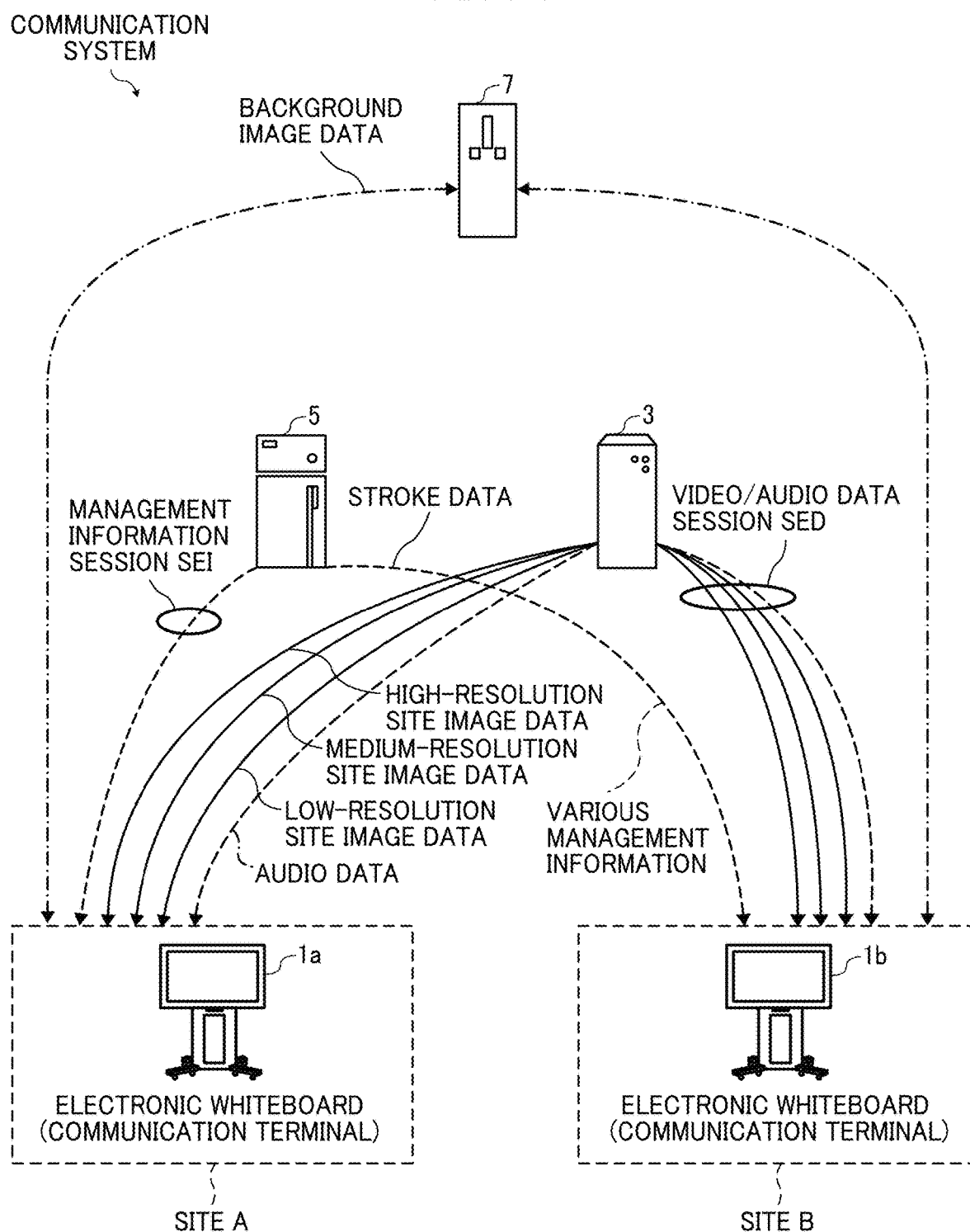
FIG. 1 is a schematic diagram illustrating an example of communication routes in a communication system, according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

Embodiments of the present invention are described with reference to the drawings. In the description of the drawings, the same elements are denoted by the same reference numerals, and redundant descriptions thereof are omitted.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Overview:

The background communication system enables sharing of data between communication terminals. For example, after a communication session is established to conduct videoconferencing, various types of data, such as stroke images, can be shared between the communication terminals. However, none of the above-described techniques considers which screen data is to be shared with other communication terminal, before starting sharing of such data. For example, the user may want to share data, which is only available locally, with the other party. In such case, it has been difficult for the communication terminal to cause the other communication terminal to firstly display such data, at a start of videoconference.

Overview of Communication System:

Communication Route:

A communication system for conducting a video conference between a plurality of electronic whiteboards including an electronic whiteboard 1a and an electronic whiteboard 1b while allowing a user to draw images on the electronic whiteboards is described with reference to FIG. 1, FIG. 1 is a diagram illustrating an example of a communication route in the communication system according to an embodiment. In this disclosure, the "video conference" is sometimes called a "teleconference" or "remote conference". The "video conference", "teleconference", or "remote conference" is an example of a session in which image data and stroke data are shared between a plurality of terminals. For example, the session in which image data and stroke data are shared may be a session other than a conference, such as a session in which a remote lesson, a remote medical examination, a meeting, or a casual conversation is performed. The session in which image data and stroke data are shared may be used to transmit information in one direction, for example, to present information.

The communication system includes a plurality of electronic whiteboards including the electronic whiteboards 1a and the electronic whiteboard 1b, a relay device 3, a communication management apparatus 5, and an image storage device 7. The electronic whiteboard 1a and the electronic whiteboard 1b perform mutual communication of image data and audio data for calls and content data such as image data and stroke data for sharing. The stroke data is data necessary for reproducing a stroke image. The stroke data includes coordinate data, line width data, line color data, vector data, and the like. The electronic whiteboards 1a and the electronic whiteboard 1b exchange image data and audio data for a call with each other to reproduce an image and sound of a site where the communication counterpart resides, making a remote video call. In this disclosure, an image of a site where each of the plurality of electronic whiteboards such as the electronic whiteboard 1a and the electronic whiteboard 1b reside may be referred to as a "site image", hereinafter. Further, data for such site image may be referred to as "site image data".

The electronic whiteboard 1a and the electronic whiteboard 1b exchange image data of a background image to be shared, allowing participants using the communication system to share the same background image. The background image is an image displayed on the display of the electronic whiteboard 1. The background image includes, for example, an image of materials, in which an electronic file of meeting materials, etc. is displayed on the display 180. The image data of the background image is transmitted and received in a file format such as JPEG (Joint Photographic Experts Group). Further, the electronic whiteboard 1a and the electronic whiteboard 1b exchange stroke data of a stroke image, allowing participants using the communication system to share the same stroke image. The stroke image is an image represented by a line or the like drawn by a user with a handwritten stroke with such as an electronic pen. The stroke image is displayed based on stroke data representing a point on a coordinate of the display.

Although in the example of FIG. 1, the communication system includes the two electronic whiteboards, i.e., the electronic whiteboard 1a and the electronic whiteboard 1b, in another example, the communication system may include three or more electronic whiteboards. The electronic whiteboard 1a and the electronic whiteboard 1b are collectively referred to as an "electronic whiteboard 1" or "electronic whiteboards 1" hereinafter, to simplify the description, unless they need to be distinguished from one to another. The electronic whiteboard 1 is an example of a communication terminal having a communication function, a drawing function, a display function, and the like. Other examples of the communication terminal include a PC, a smartphone, a tablet terminal, a smartwatch, a car navigation system, a game machine, or a telepresence robot, each of which is installed with application program corresponding the communication system. Further, the communication terminal includes a medical device. In a case where the communication terminal is a medical device, the background image is a patient image.

FIG. 1 illustrates an electronic whiteboard equipped with a videoconferencing function as an example of the electronic whiteboard 1a and the electronic whiteboard 1b. A site image based on site image data can be either a moving image or a still image.

In this disclosure, an electronic whiteboard that sends a request for starting a videoconference is referred to as a "source terminal", and an electronic whiteboard as a request destination to which the request is to be transmitted is referred to as a "destination terminal". In FIG. 1, the electronic whiteboard 1a is the source terminal and the electronic whiteboard 1b is the destination terminal. When the start of the videoconference is requested from the electronic whiteboard 1b, the electronic whiteboard 1b is the source terminal and the electronic whiteboard 1a is the destination terminal. Note that the electronic whiteboard 1a and the electronic whiteboard 1b may be used not only for communication between different sites or for communication between different rooms in the same site, but also for communication within the same room or for outdoor-indoor communication or outdoor-outdoor communication.

The relay device 3, which is implemented by one or more computers, performs a process of relaying content data for a call between the electronic whiteboard 1a and the electronic whiteboard 1b.

The communication management apparatus 5 is implemented by one or more computers. The communication management apparatus 5 centrally controls login authentication from the electronic whiteboard 1a and the electronic whiteboard 1b, the communication status of each of the electronic whiteboard 1a and the electronic whiteboard 1b, a destination list, the communication status of the relay device 3, and the like. Further, the communication management apparatus 5 relays stroke data to be shared between the electronic whiteboard 1a and the electronic whiteboard 1b.

The image storage device 7, which is implemented by one or more computers, stores image data of a background image to be shared. The background image is uploaded from the electronic whiteboard 1a, and is downloaded to the electronic whiteboard 1b. Alternatively, the background image may be uploaded from the electronic whiteboard 1b, and is downloaded to the electronic whiteboard 1a. In other words, the image storage device 7 stores the image data uploaded from the electronic whiteboard 1b, which is to be downloaded to the electronic whiteboard 1a.

In one example, each of the relay device 3, the communication management apparatus 5, and the image storage device 7 is configured as a single computer. In another example, each of the relay device 3, the communication management apparatus 5, and the image storage device 7 is configured as a plurality of computers to which one or more units (functions, means, or storages) are arbitrarily allocated. In other words, each of the relay device 3, the communication management apparatus 5, and the image storage device 7 can be implemented by a plurality of servers that operate in cooperation with one another. In this example, the communication management apparatus 5 and the image storage device 7 is configured as a server system 6 that controls data to be shared the electronic whiteboard 1a and the electronic whiteboard 1b. In the server system 6, the communication management apparatus 5 and the image storage device 7 may be configured as a single computer having one or more units (functions or means). In alternative to the communication management apparatus 5, the image storage device 7 may operate to relay stroke data to be shared between the electronic whiteboard 1a and the electronic whiteboard 1b.

In the communication system of FIG. 1, a management information session sei for exchanging various types of management information is established between the electronic whiteboard 1a and the electronic whiteboard 1b through the communication management apparatus 5. In addition, four sessions are established between the electronic whiteboard and the electronic whiteboard 1b to exchange four types of data including site image data of high resolution, site image data of medium resolution, site image data of low resolution, and audio data, through the relay device 3, In FIG. 1, these four sessions are collectively referred to as an image and audio data session sed. Note that the video and audio data session sed does not necessarily have to be four sessions and may have a smaller or larger number of sessions than the four sessions. In addition, a communication session may be established directly between the source terminal and the destination terminal without intervening the relay device 3. In the communication system, the communication management apparatus 5 may have a function of the relay device 3, such that the image and audio data session sed may be established between the electronic whiteboard 1a and the electronic whiteboard 1b through the communication management apparatus 5.

Further, in the communication system of FIG. 1, stroke data is exchanged between the electronic whiteboard 1a and the electronic whiteboard 1b using the management information session sei.

The description is now given of the resolution of an image of the site image data handled in the present embodiment. For example, the site image data of low resolution consists of 160 pixels in the horizontal direction and 120 pixels in the vertical direction. Such site image data of the low resolution is a base image. The site image data of medium resolution consists of, for example, 320 pixels in the horizontal direction and 240 pixels in the vertical direction. The site image data of high resolution consists of, for example, 640 pixels in the horizontal direction and 480 pixels in the vertical direction. In the case of a narrow band path, low-quality image data that only includes the site image data of low resolution as a base image is relayed. In the case of a relatively wide band path, intermediate-quality image data including the site image data of low resolution as a base image and the site image data of medium resolution is relayed. In the case of a very wide band path, high-quality image data including the site image data of low resolution as a base image, the site image data of medium resolution, and the site image data of high resolution is relayed. Since audio data is relatively small in data size compared with the site image data, the audio data is relayed even in the case of a narrow band path.

Figure 2:
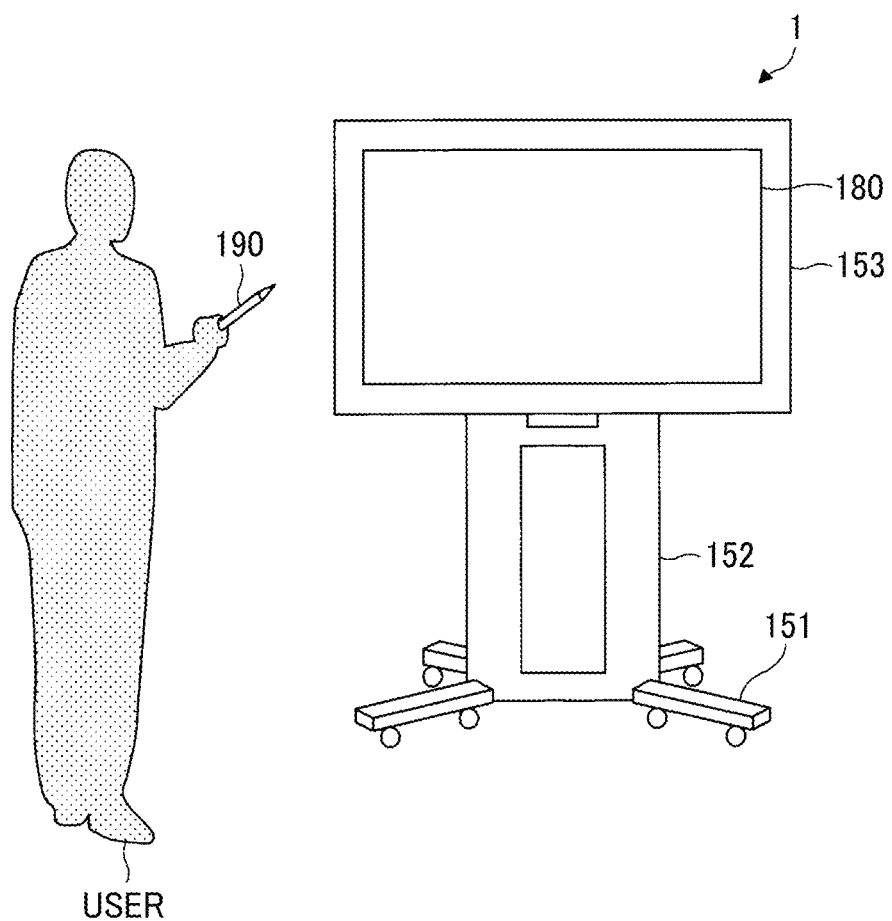
FIG. 2 is a diagram for describing how the electronic whiteboard is used according to the embodiment.

Use Scenario of Electronic Whiteboard:

FIG. 2 is a diagram for describing how the electronic whiteboard is used according to the embodiment. As illustrated in FIG. 2, the electronic whiteboard 1 includes a plurality of legs 151 each having a caster on the lower side, a support 152 provided on the upper side of the legs 151, a main body 153 provided on top of the support 152, and a display 180 provided on the front surface of the main body 153. The main body 153 includes a central processing unit (CPU) 101 and the like which is described below. The user can input (draw) a stroke image such as characters on the display 180 using an electronic pen 190. The display 180 is an example of a display (display device).

Hardware Configuration:

Next, a hardware configuration of each apparatus, device, or terminal of the communication system is described with reference to FIGS. 3 and 4. In the hardware configuration illustrated in FIG. 3 and FIG. 4, components or elements may be added or deleted as needed.

Figure 3:
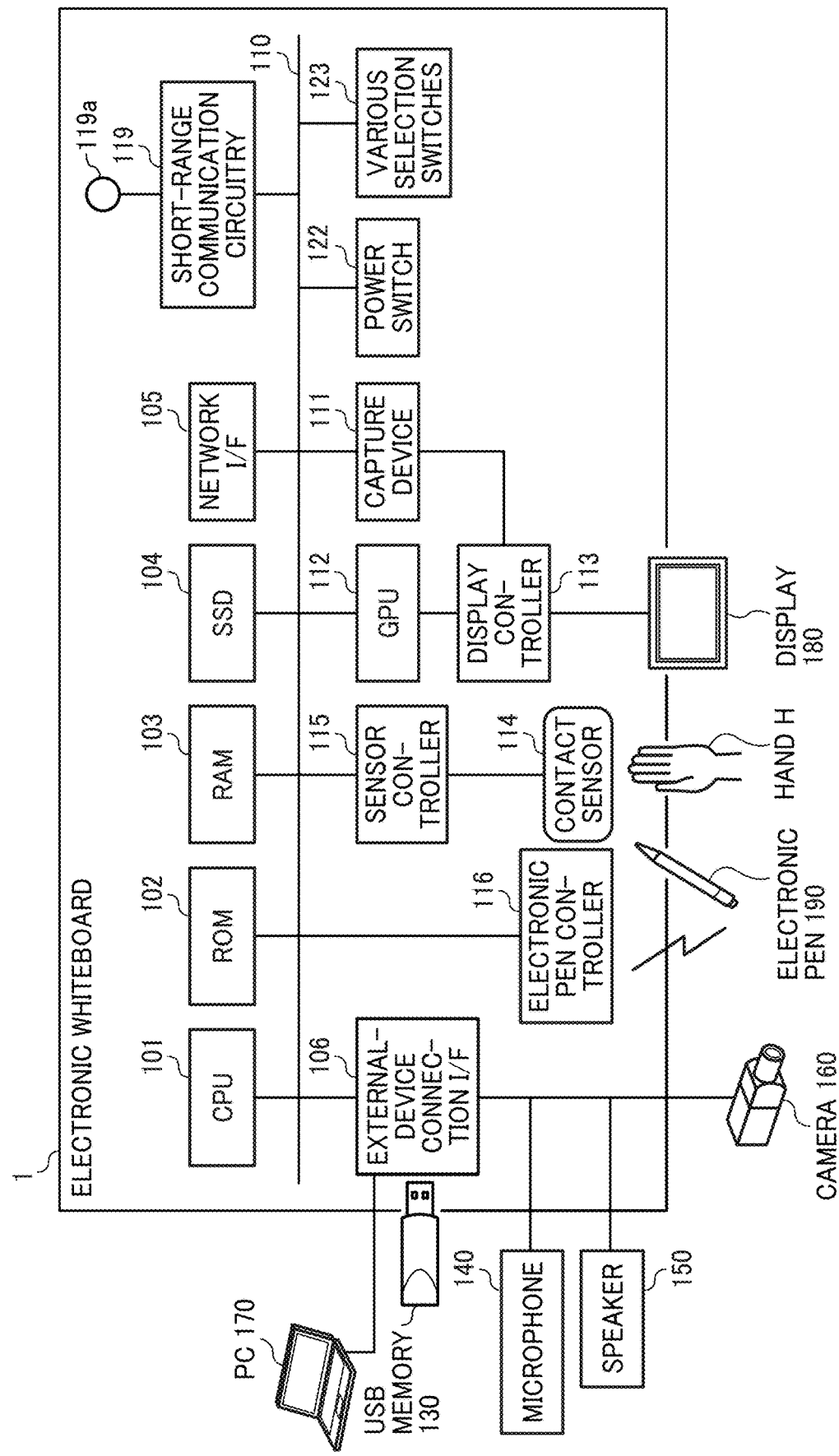
FIG. 3 is a block diagram illustrating an example hardware configuration of an electronic whiteboard according to the embodiment.

Hardware Configuration of Electronic Whiteboard:

FIG. 3 is a block diagram illustrating an example hardware configuration of an electronic whiteboard according to the embodiment. As illustrated in FIG. 3, the electronic whiteboard 1 includes a CPU 101, a read only memory (ROM) 102, a random access memory (RAM) 103, a solid state drive (SSD) 104, a network interface (I/F) 105, and an external device connection I/F 106.

The CPU 101 controls entire operation of the electronic whiteboard 1. The ROM 102 stores a control program for controlling the CPU 101 such as an initial program loader (IPL) to boot the CPU 101. The RAM 103 is a volatile memory used as a work area for the CPU 101. The SSD 104 is a large capacity storage device (memory) that stores various data such as a control program for the electronic whiteboard 1. The network I/F 105 is a communication interface that connects the electronic whiteboard 1 to connect to the communication network 100 to communicate with other apparatuses. The external device connection I/F 106 is an interface for connecting the electronic whiteboard 1 to various extraneous sources. Examples of the extraneous sources include a universal serial bus (USB) memory 130 and devices (a microphone 140, a speaker 150, and a camera 160).

The electronic whiteboard 1 further includes a capture device 111, a graphics processing unit (GPU) 112, a display controller 113, a contact sensor 114, a sensor controller 115, an electronic pen controller 116, a short-range communication circuit 119, an antenna 119a for the short-range communication circuit 119, a power switch 122, and selection switches 123.

The capture device 111 displays image data (image information) as a still image or a moving image on a display of a computer (PC) 170, which is external to the electronic whiteboard 1. The GPU 112 is a semiconductor chip dedicated to processing of a graphical image. The display controller 113 controls display of screens to output an image output from the GPU 112 to the display 180 or the like. The contact sensor 114 detects a touch on the display 180 by the electronic pen 190 or a user's hand H. The sensor controller 115 controls operation of the contact sensor 114. The contact sensor 114 senses a touch input to a specific coordinate on the display 180 using the infrared blocking system. More specifically, the display 180 is provided with two light receiving elements disposed on both upper side ends of the display 180, and a reflector frame surrounding the sides of the display 180. The light receiving elements emit a plurality of infrared rays in parallel to a surface of the display 180. The light receiving elements receive lights passing in the direction that is the same as an optical path of the emitted infrared rays, which are reflected by the reflector frame. The contact sensor 114 outputs an identifier (ID) of the infrared ray that is blocked by an object (such as the user's hand) after being emitted from the light receiving elements, to the sensor controller 115. Based on the ID of the infrared ray, the sensor controller 115 detects a particular coordinate that is touched by the object. The electronic pen controller 116 communicates with the electronic pen 190 to detect a touch by the tip or bottom of the electronic pen 190 to the display 180. The short-range communication circuit 119 is a communication circuit that communicates in compliance with the near field communication (NFC), the Bluetooth (Registered Trademark), and the like. The power switch 122 turns on or off the power of the electronic whiteboard 1. The selection switches 123 are a group of switches for adjusting brightness, hue, etc., of display on the display 180, for example.

The electronic whiteboard 1 further includes a bus line 110. The bus line 110 is, for example, an address bus or a data bus, which electrically connects the elements such as the CPU 101 illustrated in FIG. 3.

The contact sensor 114 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition to or in alternative to detecting a touch by the tip or bottom of the electronic pen 190, the electronic pen controller 116 may also detect a touch by another part of the electronic pen 190, such as a part held by a hand of the user.

Figure 4:
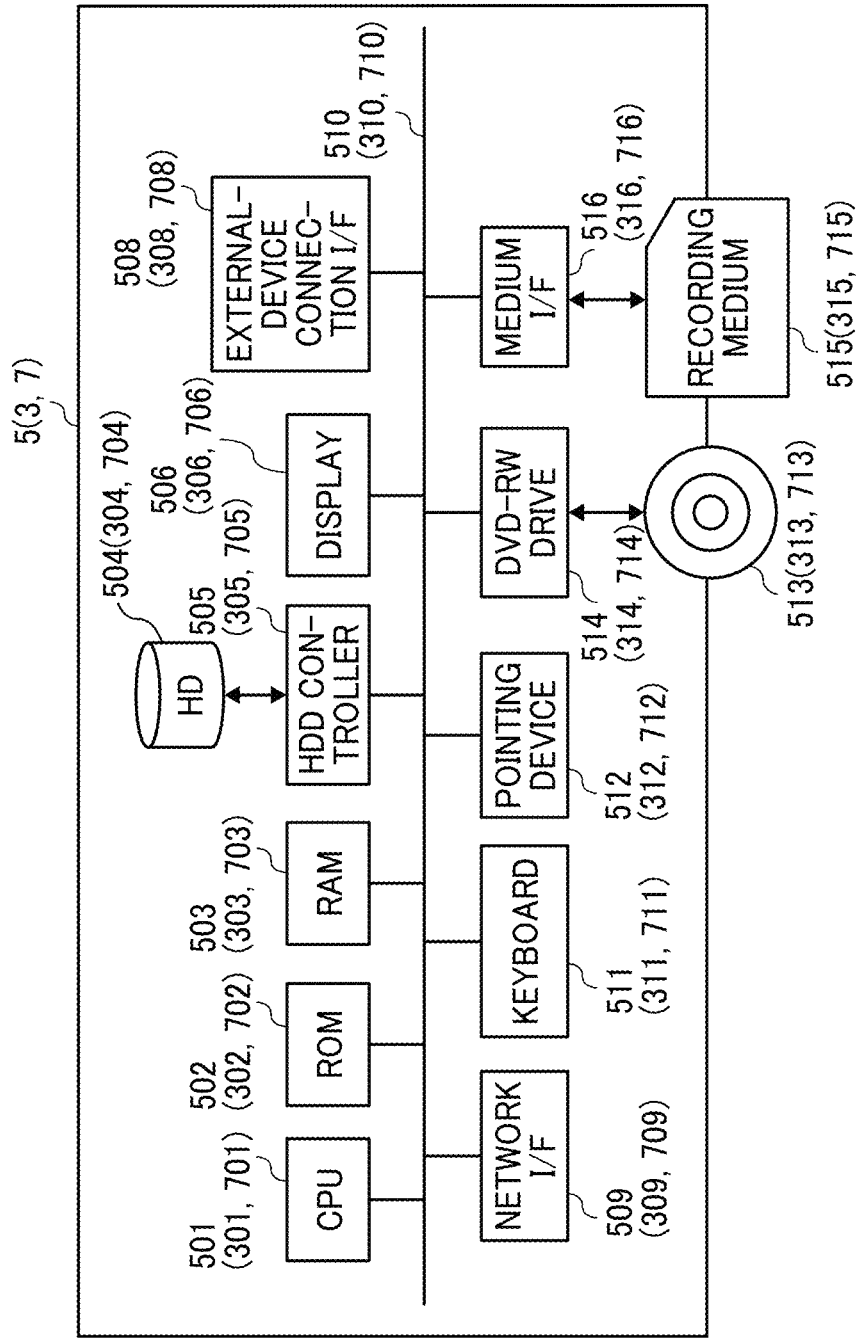
FIG. 4 is a block diagram illustrating an example of a hardware configuration of a communication management apparatus, a relay device, and an image storage device, according to the embodiment.

Hardware Configuration of Communication Management Apparatus, Relay Device, and Image Storage Device:

FIG. 4 is a block diagram illustrating an example of a hardware configuration of a communication management apparatus, a relay device, and an image storage device, according to an embodiment. The communication management apparatus 5 is implemented by, for example, one or more computers. The computer includes a CPU 501, a ROM 502, a RAM 503, a hard disk (HD) 504, a hard disk drive (HDD) controller 505, a display 506, an external device connection I/F 508, a network I/F 509, a keyboard 511, a pointing device 512, a digital versatile disc-rewritable (DVD-RW) drive 514, a medium I/F 516, and a bus line 510.

The CPU 501 controls entire operation of the communication management apparatus 5. The ROM 502 is a non-volatile memory that stores a program for controlling the CPU 501, such as an initial program loader (LPL). The RAM 503 is a volatile memory used as a work area for the CPU 501. The HD 504 is a large capacity storage device (memory) that stores various data such as a communication control program. The HDD controller 505 controls reading or writing of various data to or from the HD 504 under control of the CPU 501. The display 506 displays various information such as a cursor, menu, window, characters, or image. The external device connection I/F 508 is an interface that connects the computer as the communication management apparatus 5 to various extraneous sources. The network I/F 509 is an interface for performing data communication using the communication network 100 such as the Internet. The keyboard 511 is one example of an input device (input means) provided with a plurality of keys for enabling a user to input characters, numerals, or various instructions. The pointing, device 512 is an example of an input device (input means) that allows a user to select or execute a specific instruction, select a target for processing, or move a cursor being displayed. The DVD-RW drive 514 controls reading or writing (storing) of data to the DVD-RW 513. In another example, a DVD-R can be used as the removal storage medium, in alternative to the DVD-RW 513, in still another example, in alternative to or in addition to the DVD-RW drive 514, a Blu-ray (registered trademark) drive or a compact disc rewritable (CD-RW) drive are used to control reading or writing (storing) of data with respect to a Blu-ray disc rewritable (BD-RE) or a CD-RW. The medium I/F 516 controls reading or writing (storing) of data with respect to a storage medium 515 such as a flash memory. The bus line 510 is an address bus, a data bus or the like, which electrically connects the elements illustrated in FIG. 4 such as the CPU 501.

The relay device 3 is implemented by one or more computers. As illustrated in FIG. 6, the relay device 3 includes a central processing unit (CPU) 301, a read only memory (ROM) 302, a random access memory (RAM) 303, a hard disk (HD) 304, a hard disk drive (HDD) controller 305, a display 306, an external device connection interface WO 308, network I/F 309, a bus line 310, a keyboard 311, a pointing device 312, a digital versatile disc rewritable (DVD-RW) drive 314 and a medium I/F 316. Since these elements are substantially similar to the CPU 501, the ROM 502, the RAM 503, the HD 504, the HDD controller 505, the display 506, the external device connection I/F 508, the network I/F 509, the bus line 510, the keyboard 511, the pointing device 512, the DVD-RW drive 514, and the medium I/F 516 of the communication management apparatus 5, redundant description thereof is omitted. The relay device 3, however, stores a relay control program in the HD 304 in alternative to the relay control program.

The image storage device 7 is implemented by one or more computers. As illustrated in FIG. 6, the image storage device 7 includes a CPU 701, a ROM 702, a RAM 703, a HD 704, a HDD controller 705, a display 706, an external device connection interface (I/F) 708, network I/F 709, a bus line 710, a keyboard 711, a pointing device 712, a DVD-RW drive 714 and a medium I/F 716. Since these elements are substantially similar to the CPU 501, the ROM 502, the RAM 503, the HD 504, the HDD controller 505, the display 506, the external device connection I/F 508, the network I/F 509, the bus line 510, the keyboard 511, the pointing device 512, the DVD-RW drive 514, and the medium I/F 516 of the communication management apparatus 5, redundant description thereof is omitted. In addition, the image storage device 7 stores an image storage control program in the HD 704 in alternative to the communication control program.

Further, any one of the above-described control programs may be recorded in a file in a format installable or executable on a computer-readable storage medium for distribution. Examples of the storage medium include, but not limited to, compact disc-recordable (CD-R), DVD, Blu-ray disc, and secure digital (SD) card. In addition, such storage medium may be provided in the form of a program product to users within a certain country or outside that country. For example, the communication terminal such as the electronic whiteboard executes the control program to implement a screen sharing method according to the present disclosure.

Figure 5:
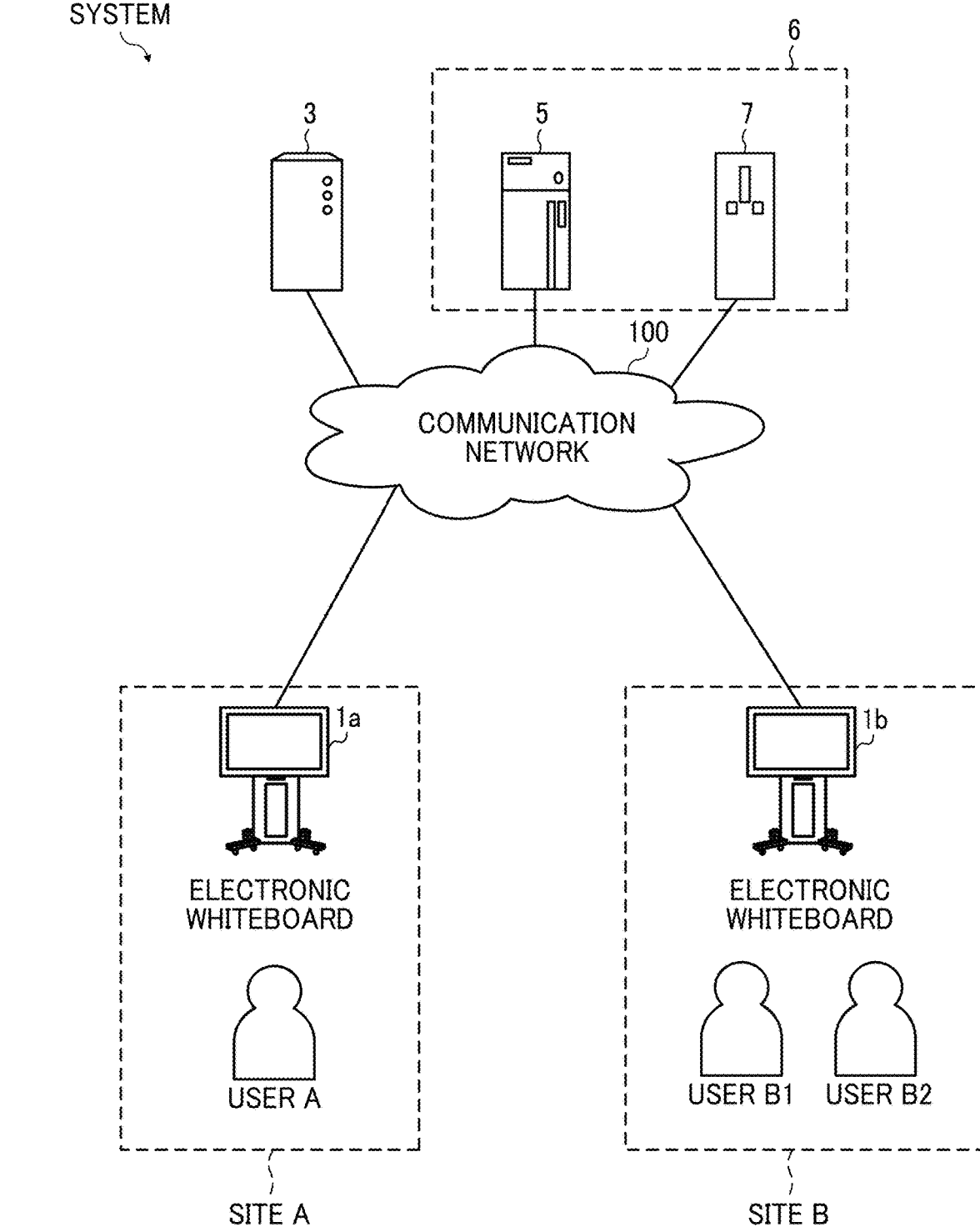
FIG. 5 is a diagram illustrating an example of a system configuration of the communication system, according to the embodiment.

Overview of Configuration of Communication System:

A description is now given of an overall configuration of the communication system with reference to FIG. 5, according to an embodiment. FIG. 5 is a diagram illustrating an example of a system configuration of the communication system, according to the embodiment.

In FIG. 5, the electronic whiteboard 1a is provided at a site A, and the electronic whiteboard 1b is provided at a site B. For example, the site A is a Tokyo office in Japan, and the site B is a Beijing office in China. Further, a user A1 uses the electronic whiteboard 1a at the site A, and users B1 and B2 use the electronic whiteboard 1b at the site B.

The electronic whiteboard 1a, the electronic whiteboard 1b, the relay device 3, the communication management apparatus 5, and the image storage device 7 mutually communicate data through the communication network 100 such as the Internet or LAN. The communication network 100 may not only include a wired network, but also a wireless network such as a network in compliance with \Vi-Fi (registered trademark) or the like.

Figure 6A:
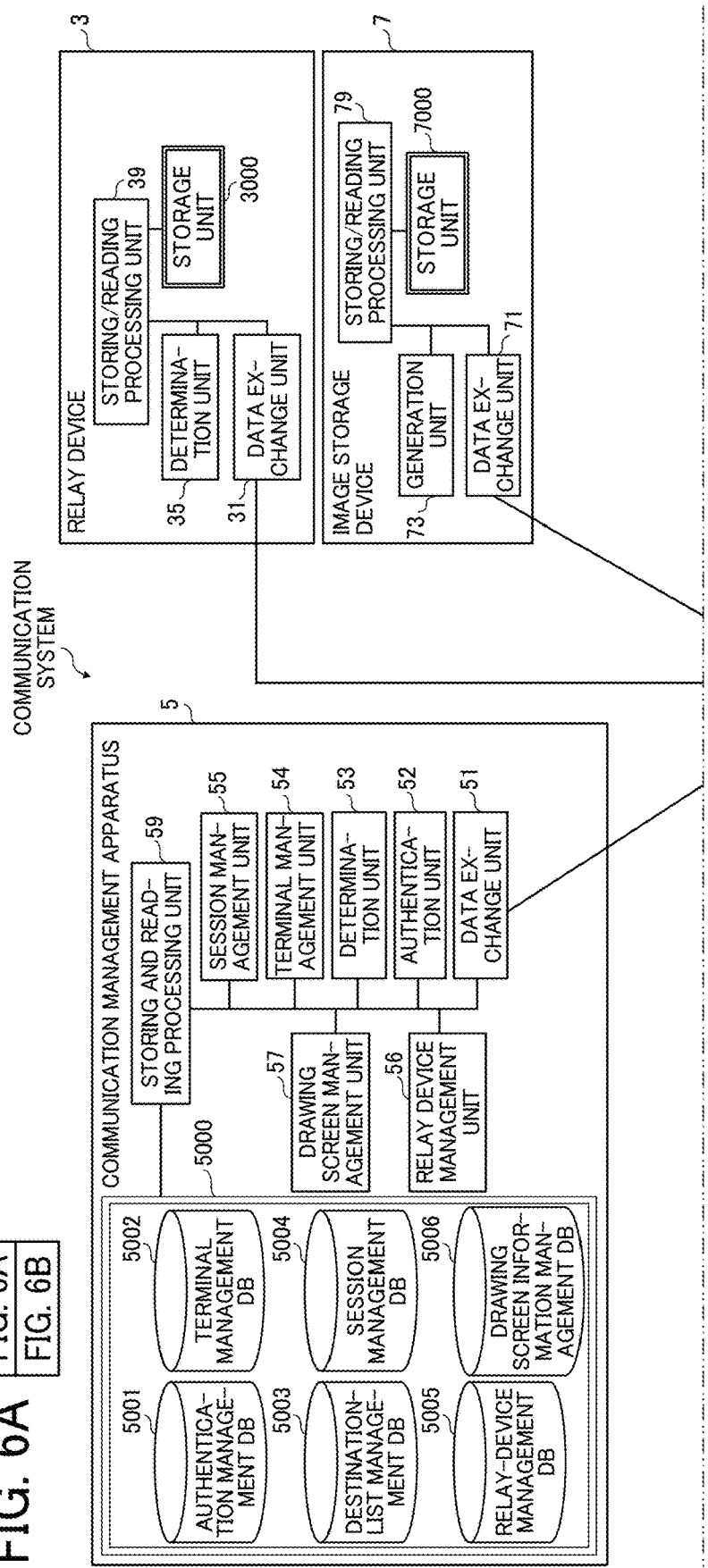
FIGS. 6A and 6B (FIG. 6) are a diagram illustrating an example of a functional configuration of the communication system according to the embodiment.
Figure 6B:
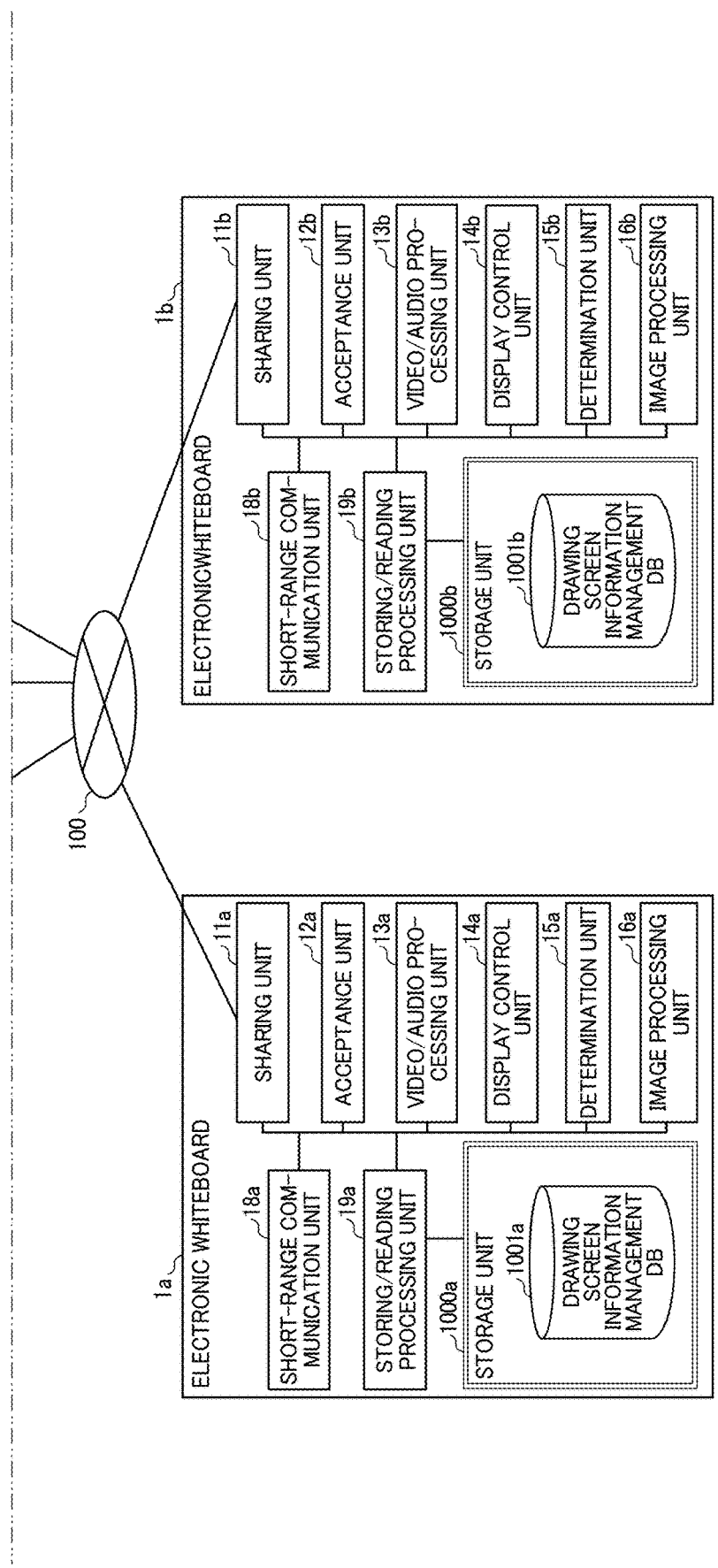

Functional Configuration of Communication System:

A description is now given of a functional configuration of the communication system according to embodiments, with reference to FIG. 6A to FIG. 10. FIG. 6 is a diagram illustrating an example of a functional configuration of the communication system according to the embodiment. FIG. 6 illustrates a terminal, an apparatus, and a server that relate to processes or operations to be described below among the terminals, apparatuses, and servers illustrated in FIG. 5.

Functional Configuration of Electronic Whiteboard:

First, referring to FIG. 6, a description is given of the functional configuration of the electronic whiteboard 1 according to the embodiment. Since the functions of the electronic whiteboards 1a and 1b are the same, the functions of the electronic whiteboard 1 will be described here. The electronic whiteboard 1 includes a sharing unit 11, an acceptance unit 12, a video/audio processing unit 13, a display control unit 14, a determination unit 15, an image processing unit 16, a short-range communication unit 18, and a storing/reading processing unit 19. These units are functions implemented by or caused to function by operating any of the hardware elements illustrated in FIG. 3 in cooperation with the instructions of the CPU 101 according to the control program expanded from the SSD 104 to the RAM 103. The electronic whiteboard 1 further includes a storage unit 1000, which is implemented by the RAM 103, the SSD 104, or the USB memory 130 illustrated in FIG. 3.

The sharing unit 11, which is implemented by instructions of the CPU 101 and by the network I/F 105 illustrated in FIG. 3, controls sharing of various types of data (or information) with other terminal, device, apparatus, or system through the communication network 100. For example, the sharing unit 11 shares screen data, such as screen data to be used for such as drawing, to be displayed on the display 180, with other electronic whiteboard 1. The screen data used for such as drawing (referred to as the drawing screen data) is screen data that allows a user to draw strokes, such that the screen data may include a stroke image. The sharing unit 11 also functions as a communication starting unit, for example, and performs a process of starting communication with other electronic whiteboard 1. For example, the sharing unit 11, which functions as a data exchange unit, transmits or receives screen data to be shared with other electronic whiteboard 1 via the communication management apparatus 5.

The acceptance unit 12, which is implemented by instructions of the CPU 101, by the contact sensor 114, and by the electronic pen controller 116 illustrated in FIG. 3, receives various inputs from the user, which is input with such as the electronic pen 190. As the user moves such as the electronic pen 190 in contact with the display 180, the acceptance unit 12 accepts an input of a stroke movement (trajectory). For example, the acceptance unit 12 accepts a selection on, for example, various types of selection screens, displayed on the display 180.

The video/audio processing unit 13 is implemented by instructions from the CPU 101 illustrated in FIG. 3, and performs processing to conduct video conference. For example, the video/audio processing unit 13 performs digital processing such as encoding of site image data and audio data in accordance with the output signal of the microphone 140 and the output signal of the camera 160. Further, the video/audio processing unit 13 generates an image signal and an audio signal based on the site image data and the audio data received at the sharing unit 11. The video/audio processing unit 13*a* performs processing for combining site image data having different resolutions.

The display control unit 14 is implemented by instructions of the CPU 101 and by the display controller 113 illustrated in FIG. 3, and controls output of an image signal to the display 180, for example. For example, the display control unit 14 controls the display 180 to display a screen for drawing, based on drawing screen data generated at the image processing unit 16. The determination unit IS, which is implemented by instructions of the CPU 101 illustrated in FIG. 3, has a function of making various determinations.

The image processing unit 16 is implemented by instructions from the CPU 101 and the capture device 111 illustrated in FIG. 3, and performs processing related to functions of the electronic whiteboard. For example, the image processing unit 16 generates stroke data and a stroke image based on a stroke of the electronic pen 190 or the like, accepted by the acceptance unit 12*a*. Alternatively, the image processing unit 16 generates a stroke image based on stroke data received by the sharing unit 11.

The short-range communication unit 18, which is implemented by instructions of the CPU 101 and the short-range communication circuit 119 with the antenna 119*a*, illustrated in FIG. 3, communicates with a terminal device carried by the user, such as an IC card or a smartphone, to obtain or provide data from or to the IC card or the smartphone by short-range communication.

The storing/reading processing unit 19, which is implemented by instructions of the CPU 101 illustrated in FIG. 3, has a function of storing various data in the storage unit 1000, and reads various data from the storage unit 1000. Further, every time site image data and audio data are received in performing communication with other terminal, the storing/reading processing unit 19 overwrites the site image data and audio data stored in the storage unit 1000. The display 180 displays an image based on site image data before being overwritten. The speaker 150 outputs sound based on audio data before being overwritten. The storage unit 1000 further stores stroke data corresponding to a stroke image drawn on the display 180 and background image data corresponding to a background image displayed on the display 180.

Figure 7:
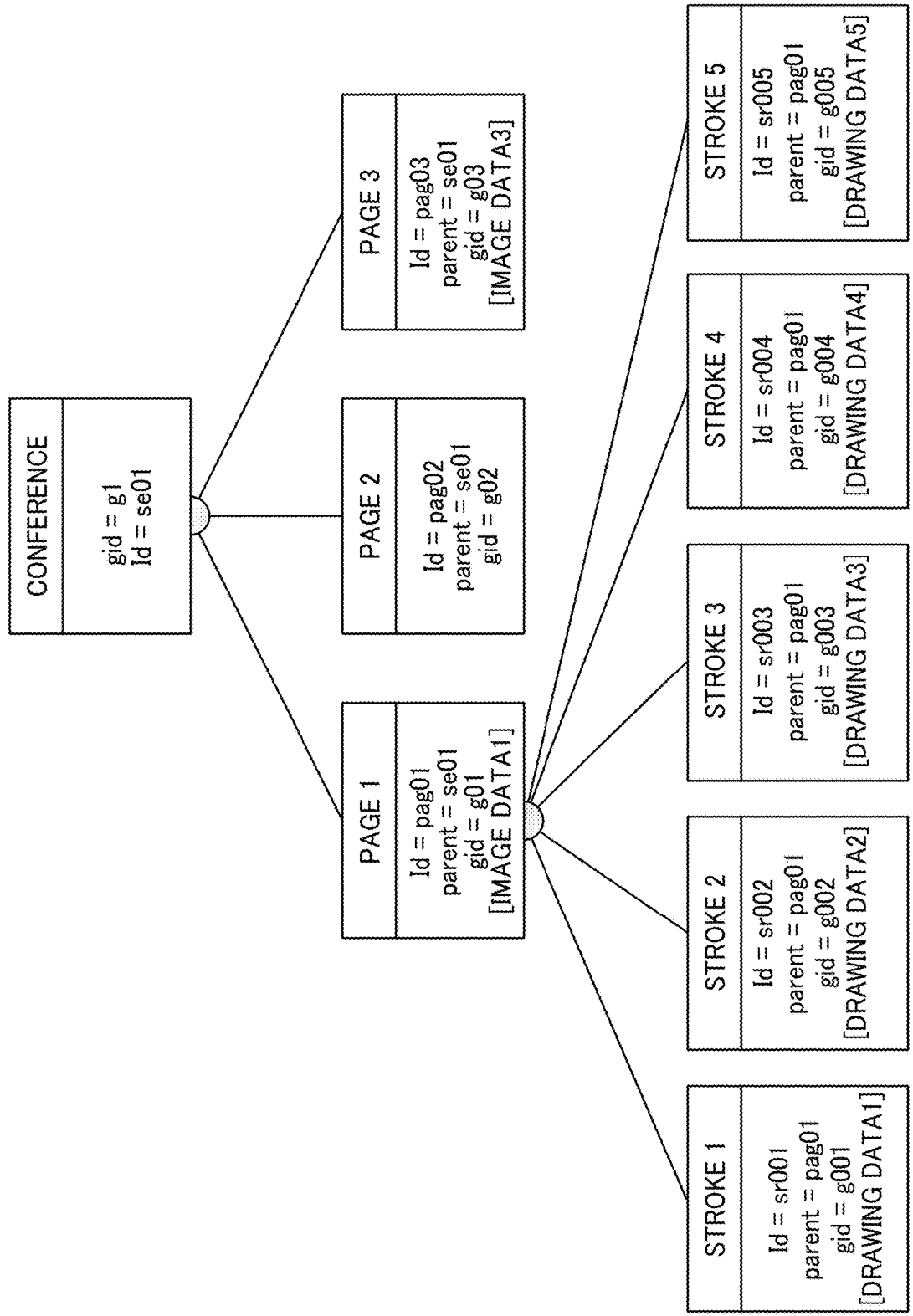
FIG. 7 is a schematic diagram illustrating an example of drawing screen information according to the embodiment.

Drawing Screen Information:

FIG. 7 is a schematic diagram illustrating an example of drawing screen information according to the embodiment. FIG. 7 illustrates an example image of a drawing screen displayed on the electronic whiteboard 1, based on information stored in the drawing screen management DB 1001.

As illustrated in the example of FIG. 7, the drawing screen has a hierarchical structure, classified by "conference", "page (pages 1 to 4)", and "stroke (strokes 1 to 5)". The "stroke" corresponds to stroke data in this embodiment, and is managed for each "page". The "page" represents a one-page screen (display screen) displayed on the display 180. The "conference" represents information on a conference being conducted using the electronic whiteboard 1. For example, the stroke 1 includes, for example, a stroke ID (id=sr001) for identifying stroke 1, information (parent=pag01) for identifying page 1 where stroke 1 exists, gid (global id) "G001" of drawing data 1, and drawing data 1. For example, when operation such as movement is performed on the stroke image represented by the stroke 1, the stroke ID (id=sr001) is inherited as it is, but the gid "g001" for identifying the drawing data 1 and the drawing data 1 are each updated. The drawing data 1 is drawing data for reproducing the stroke 1. The drawing data 1 includes, for example, coordinate data, line width data, line color data, vector data, and the like.

The electronic whiteboard 1 can switch pages, and the "page" corresponds to each page of the electronic whiteboard 1. For example, the page 1 includes a page ID (id=pag01) for identifying page 1, information (parent=se01) for identifying a "conference" being conducted at the electronic whiteboard 1, gid "g01" for identifying a page (page data), and image data 1. The image data 1 is image data of a background image contained in the page 1. That is, the image data 1 represents the background image displayed on the page 1. In this example, the page 2 does not include image data. This means that the page 2 has no background image (or a blank background).

The "conference" corresponds to the conference being conducted at the electronic whiteboard 1, and is managed using the conference ID for identifying the conference and the gid "g1" of the conference (conference information). Further, when the electronic whiteboard 1 communicates remotely with other electronic whiteboard, the conference ID corresponds to the session ID (id=se01) for identifying the session. For example, the image processing unit 16 of the electronic whiteboard 1 can generate the stroke image drawn on the page 1 by using the drawing data 1 to 5 included in the strokes 1 to 5. The gid (global id) in each layer is assigned by the communication management apparatus 5 when the screen data is shared with other electronic whiteboard. Further, the hierarchical structure of the drawing screen information in FIG. 7 is shared between a plurality of electronic whiteboards 1 when screen data is shared.

Functional Configuration of Relay Device:

Referring to FIG. 6, a functional configuration of the relay device 3 is described according to the embodiment. The relay device 3 includes a data exchange unit 31, which also functions as a transfer unit, a determination unit 35, and a storing/reading processing unit 39. These units are functions implemented by or caused to function by operating any of the hardware elements illustrated in FIG. 4 in cooperation with the instructions of the CPU 301 according to the relay control program expanded from the HD 304 to the RAM 303. Further, the relay device 3 includes a storage unit 3000 implemented by the RAM 303, the HD 304, or the recording medium 315, illustrated in FIG. 4.

The data exchange unit 31, which is implemented by instructions of the CPU 301 and by the network I/F 309 illustrated in FIG. 4, transmits or receives various types of data (or information) to or from other terminal, device, apparatus, or system through the communication network 100. The data exchange unit 31 also functions as a transfer unit, and transfers site image data and audio data transmitted from one terminal to another terminal. The determination unit 35, which is implemented by instructions of the CPU 301 illustrated in FIG. 4, has a function of making various determinations such as determination of whether delay in data transmission has occurred.

The storing/reading processing unit 39, which is implemented by instructions of the CPU 301 illustrated in FIG. 4, has a function of storing various data in the storage unit 3000, and reads various data from the storage unit 3000.

Functional Configuration of Communication Management Apparatus:

Referring to FIG. 6, a functional configuration of the communication management apparatus 5 is described according to the embodiment. The communication management apparatus 5 includes a data exchange unit 51, an authentication unit 52, a determination unit 53, a terminal management unit 54, a session management unit 55, a relay device management unit 56, a drawing screen management unit 57, and a storing/reading processing unit 59. These units are functions implemented by or caused to function by operating any of the hardware elements illustrated in FIG. 4 in cooperation with the instructions of the CPU 501 according to the communication control program expanded from the HD 504 to the RAM 503. Further, the communication management apparatus 5 includes a storage unit 5000 implemented by the RAM 503, the HD 504, or the storage medium 515, illustrated in FIG. 4.

The data exchange unit 51, which is implemented by instructions of the CPU 501 and by the network I/F 509 illustrated in FIG. 4, transmits or receives various types of data (or information) to or from other terminal, device, apparatus, or system through the communication network 100. For example, the data exchange unit 51 controls transmission or reception of stroke data between the electronic whiteboard 1 and other electronic whiteboard.

The authentication unit 52, which is implemented by instructions of the CPU 501 illustrated in FIG. 4, authenticates a login request source terminal, which sends a request for login to the communication management apparatus 5. Specifically, in response to receiving login request information at the data exchange unit 51, the authentication unit 52 authenticates the login request source terminal using information registered in the authentication management DB 5001. The determination unit 53, which is implemented by instructions of the CPU 501 illustrated in FIG. 4, has a function of making various determinations.

The terminal management unit 54, which is implemented by instructions of the CPU 501 illustrated in FIG. 4, manages various information on the electronic whiteboard 1 stored in the terminal management DB 5002 according to a state of the electronic whiteboard 1. For example, the terminal management unit 54 updates information stored in the terminal management DB 5002, such as an operating status, a date and time of reception, and an IP address of a terminal. Further, the terminal management unit 54 manages the destination list management DB 5003, and provides destination list information including a terminal ID of one or more destination terminals managed by the destination list management DB 5003 in response to a request from the electronic whiteboard 1.

The session management unit 55, which is implemented by instructions of the CPU 501 illustrated in FIG. 4, manages a session held in the communication system. For example, the session management unit 55 generates a session ID for identifying a session, according to start request information requesting the start of communication by the electronic whiteboard 1. Further, the session management unit 55 stores and manages, for the session ID of each session, various information related to the session in the session management DB 5004.

The relay device management unit 56, which is implemented by instructions of the CPU 501 illustrated in FIG. 4, has a function of selecting the relay device 3 to be used for relaying data in a particular session from among the plurality of relay devices 3. For example, the relay device management unit 56, which manages the relay device management DB 5005, selects one relay device 3 using various information regarding each relay device 3 stored in the relay device management DB 5005. In one example, the relay device management unit 56 selects the relay device 3 residing near the source terminal, based on the IP address of each relay device 3 stored in the relay device management DB 5005 and the IP address of the source terminal, for example. In another example, the relay device management unit 56 selects the relay device 3 based on, for example, the maximum data transmission rate of each relay device 3 stored in the relay device management DB 5005. The relay device 3 used for relaying data in the session may be selected in any other method. Further, the number of relay devices 3 included in the communication system may be one.

The drawing screen management unit 57, which is implemented by instructions of the CPU 501 illustrated in FIG. 4, manages various data or information related to the drawing screen transmitted and received between the electronic whiteboards 1 (communication terminals). The drawing screen management unit 57 stores, for example, the stroke data transmitted from the electronic whiteboard 1 participating in the session sei, in the drawing screen information management DB 5006 in association with the session ID for management.

The storing/reading processing unit 59, which is implemented by instructions of the CPU 501 illustrated in FIG. 4, has a function of storing various data in the storage unit 5000, and reads various data from the storage unit 5000.

Authentication Management Table:

FIG. 8A is a conceptual diagram illustrating an example of an authentication management table, according to the embodiment. The storage unit 5000 stores an authentication management database (DB) 5001, which is implemented by the authentication management table as illustrated in FIG. 8A. The authentication management table stores, for each one of the electronic whiteboards 1 managed by the communication management apparatus 5, a terminal ID of the electronic whiteboard and a password in association with each other. For example, the authentication management table illustrated in FIG. 8A indicates that the terminal ID of the electronic whiteboard 1*a* (communication terminal) is "01aa" and the password of the electronic whiteboard 1*a* is "aaaa". The password is an example of authentication information. The authentication information also includes an access token.

Terminal Management Table:

FIG. 8B is a conceptual diagram illustrating an example of a terminal management table, according to the embodiment. The storage unit 5000 stores a terminal management DB 5002, which is implemented by the terminal management table as illustrated in FIG. 8B. The terminal management table stores, for each one of the terminal IDs identifying the electronic whiteboards 1 (communication terminals), a terminal name to be used when each electronic whiteboard 1 is a destination terminal, an operating status of each electronic whiteboard 1, reception date and time when login request described below is received by the communication management apparatus 5, and the internet protocol (IP) address of each electronic whiteboard 1 (communication terminal) in association with each other. For example, the terminal management table illustrated in FIG. 8B indicates that the electronic whiteboard 1a whose terminal ID is "01aa" has the terminal name "JAPAN TOKYO OFFICE TERMINAL AA" and the operating status of the electronic whiteboard 1a is "Online (Ready)". Further, the terminal management table indicates that the date and time when the login request is received by the communication management apparatus 5 is "13:40 on Feb. 10, 2019" and the IP address of the electronic whiteboard 1a is "1.2.1.3". The terminal ID, the terminal name, and the IP address of the communication terminal are stored when each electronic whiteboard 1 is pre-registered to receive service provided by the communication management apparatus 5.

Destination List Management Table:

FIG. 9A is a conceptual diagram illustrating an example of a destination list management table, according to an embodiment. The storage unit 5000 stores a destination list management DB 5003, which is implemented by the destination list management table as illustrated in FIG. 9A. The destination list management table stores the terminal ID of the source terminal (electronic whiteboard 1) that sends a request for a start of communication in association with the terminal IDs of all destination terminals (electronic whiteboards 1) registered as destination terminal candidates for the source terminal. For example, the destination list management table illustrated in FIG. 9A indicates that the destination terminal candidates to which the source terminal (electronic whiteboard 1a) whose terminal ID is "01aa" can send the request for the start of communication are the electronic whiteboard 1b whose terminal ID is "01ba", etc. The destination terminal candidates are updated by addition or deletion in response to an addition or deletion request transmitted from any source terminal to the communication management apparatus 5.

The destination list is an example of destination information. In another example, the destination information can be managed in various ways other than the list format as illustrated in FIG. 9A, as long as information on destination such as a terminal ID can be obtained.

Session Management Table:

FIG. 9B is a conceptual diagram illustrating an example of a session management table, according to the embodiment. The storage unit 5000 stores a session management DB 5004, which is implemented by the session management table as illustrated in FIG. 9B. The session management table stores, for each session ID for identifying a session to perform mutual communication between each electronic whiteboard 1 (communication terminal) and the relay device 3, a relay device ID of the relay device 3 to be used, a source terminal ID of the electronic whiteboard 1 (source terminal), a destination terminal ID of electronic whiteboard 1 (destination terminal), a delay time (ms) in receiving site image data at the destination terminal, and reception date and time when delay information indicating this delay time is transmitted from the destination terminal and received by the communication management apparatus 5, in association. For example, the session management table illustrated in FIG. 9B indicates that, in a communication session identified with the session ID "se01", the relay device with the relay device ID "111a" relayed site image data and audio data between the electronic whiteboard with the terminal ID "01aa" and the electronic whiteboard with the terminal ID "01db", the delay time of the site image data received by the electronic whiteboard (destination terminal) at "13:41 on Feb. 10, 2019" was 200 ms.

Relay Device Management Table:

FIG. 9C is a conceptual diagram illustrating an example of a relay device management table, according to the embodiment. The storage unit 5000 stores a relay device management DB 5005, which is implemented by the relay device management table as illustrated in FIG. 9C. The relay device management table stores, for each one of the relay devices 3, the relay device ID, the operating status of the relay device 3, the date and time when the communication management apparatus 5 received status information indicating the operating status, an IP address of the relay device 3, and maximum data transmission rate (Mbps) of the relay device 3, in association. For example, the relay device management table illustrated in FIG. 9C indicates that the relay device 3 whose relay device ID is "111a" has the operation status "Online", the date and time when the communication management apparatus 5 received the operating status is "13:30 on Feb. 10, 2019", the IP address of the relay device 3 is "1.2.1.2", and the maximum data transmission rate of the relay device 3 is 100 Mbps.

Drawing Screen Information Management Table:

FIG. 10 is a conceptual diagram illustrating an example of a drawing screen information management table, according to the embodiment. The storage unit 5000 stores a drawing screen information management DB 5006, which is implemented by the drawing screen information management table as illustrated in FIG. 10. The drawing screen information management table stores, for each session ID identifying a session to perform mutual communication between each electronic whiteboard 1 (communication terminal) and the relay device 3, various data related to a drawing screen to be shared between the electronic whiteboards 1. Various data in the drawing screen information management table correspond to a state of the drawing screen stored in the drawing screen management DB 1001 for each electronic whiteboard 1 (FIG. 7).

For example, the drawing screen information management table includes an ID for identifying each data, a sequence number indicating an order determined by time when each data was generated, information (body) indicating the content of each data, and information (parent) for identifying a parent (root) of each data. For example, in the case of conference information indicating a video conference being executed by a plurality of electronic whiteboards 1, the drawing screen information management table includes a conference ID (session ID) for identifying the conference being executed, information (children) indicating one or more pages having been generated at the conference, and information (current page) indicating a page of the drawing screen currently displayed on the electronic whiteboard 1. In another example, in the case of page data, the drawing screen information management table includes a page ID for identifying a page (page data), and a URL (Uniform Resource Locator) indicating the storage location of background image data of that page.

In another example, in the case of stroke data, the drawing screen information management table includes a stroke ID for identifying the stroke data generated by the "stroke drawing" event, information (body) indicating the content of the stroke data, and information (parent) identifying a parent page (page data). In this case, the information (body) indicating the content of the stroke data includes a color of the drawn stroke, a width indicating the line thickness of the drawn stroke, and a vertex (x, y) of the drawn stroke.

In the embodiment, the "stroke drawing" is processing of inputting drawing data by a user. For example, the stroke drawing is an event detected from when a user presses the electronic pen 190 against the display 180 and moves the electronic pen 190 with the electronic pen in contact with the surface of the display 180 until when the user releases the electronic pen 190 from the display 180. The color of the stroke is represented in a data format of RGBA (Red Green Blue Alpha), and each element is represented by a numerical value of 0 to 255. Further, the width of the line of the drawn stroke is represented by the number of pixels. The vertices of the drawn stroke are represented by X-Y coordinates. A Bezier curve obtained from the vertices forms a line segment indicating the stroke. Using this drawing screen information management table, the communication management apparatus 5 manages various data relating to a drawing screen, including stroke data generated during a video conference, conducted through a particular communication session.

Functional Configuration of Image Storage Device:

Referring to FIG. 6, a functional configuration of the image storage device 7 is described according to the embodiment. The image storage device 7 includes a data exchange unit 71, a generation unit 73, and a storing/reading processing unit 79. These units are functions that are implemented by or that are caused to function by operating any of the elements illustrated in FIG. 4 in cooperation with instructions of the CPU 701 according to the image storage device control program expanded from the HD 704 to the RAM 703. Further, the image storage device 7 includes a storage unit 7000 implemented by the RAM 703, the HD 704, or the recording medium 715, illustrated in FIG. 4.

The data exchange unit 71, which is implemented by instructions of the CPU 701 and by the network I/F 709 illustrated in FIG. 4, transmits or receives various types of data (or information) to or from other terminal, device, apparatus, or system through the communication network 100. The generation unit 73, which is implemented by the instructions of the CPU 701 illustrated in FIG. 4, generates a URL indicating the storage location of the background image data. The storing/reading processing unit 79, which is implemented by instructions of the CPU 701 illustrated in FIG. 4, has a function of storing various data in the storage unit 7000, and reads various data from the storage unit 7000.

Operation:

Referring to FIGS. 11 to 25, operation performed by the communication system is described according to the embodiment.

Figure 11:
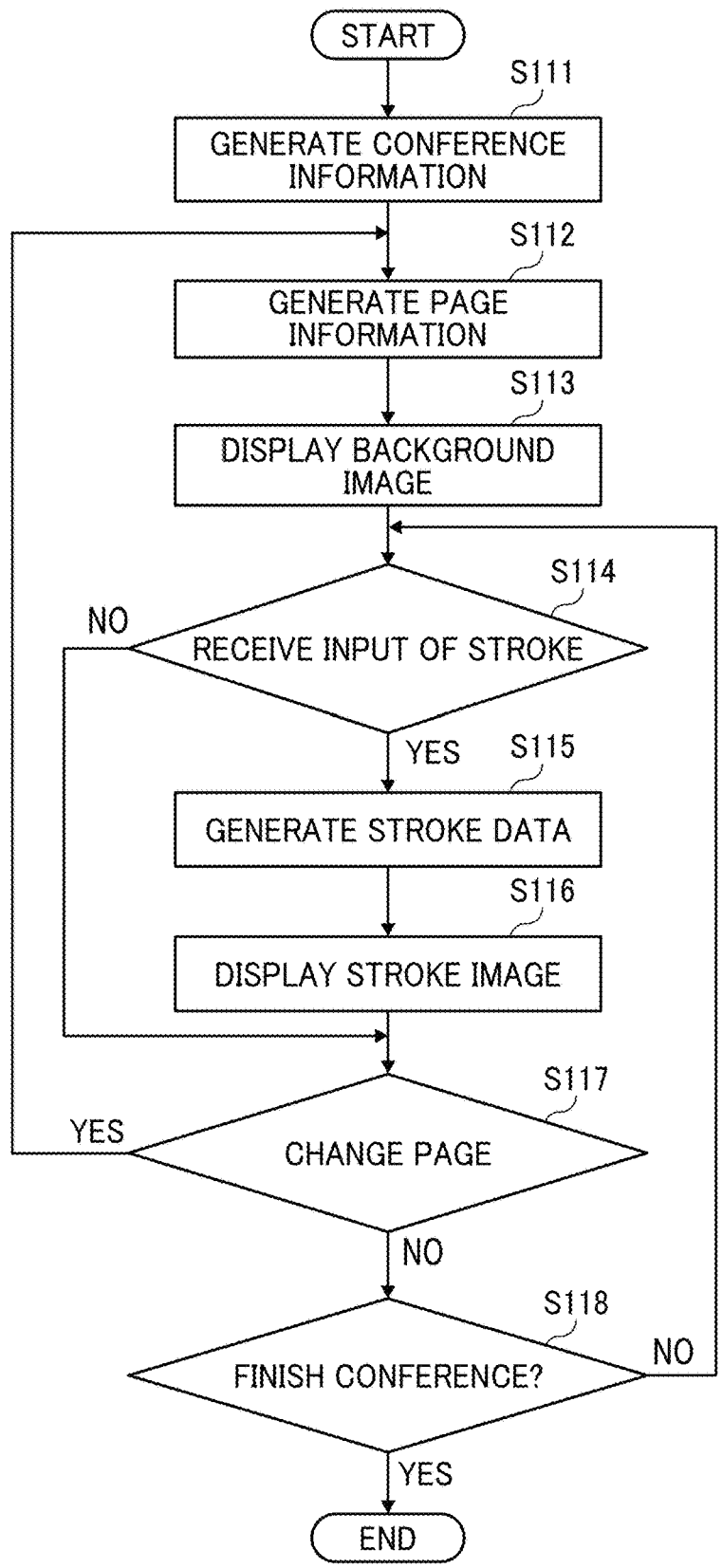
FIG. 11 is a flowchart illustrating example processing of generating a drawing screen at the electronic whiteboard, according to the embodiment.

Processing to Generate Drawing Screen:

First, referring to FIGS. 11 and 12A to 12C, processing of generating a drawing screen by the electronic whiteboard 1 before starting remote communication with other electronic whiteboard 1 is described according to the embodiment. FIG. 11 is a flowchart illustrating example processing of generating a drawing screen at the electronic whiteboard.

In the following, it is assumed that the user A at site A has started a conference using the electronic whiteboard 1a, before starting remote communication with other electronic whiteboard 1b. Before starting remote communication, it is assumed that each of the electronic whiteboard 1a and the electronic whiteboard 1b generates a drawing screen as described below.

First, the image processing unit 16 of the electronic whiteboard 1 generates conference information on the conference being conducted (S111). The conference information includes a conference ID for identifying the conference being conducted at the electronic whiteboard 1. Next, the image processing unit 16 generates page information on a page displayed on the display 180 (S112). The page information includes a page ID for identifying a particular page, and information (parent) for identifying a conference being conducted at the electronic whiteboard 1.

The display control unit 14 controls the display 180 to display a background image of the drawing screen (S113). The image data of the background image being displayed is associated with the page information generated at S112.

Next, as the user moves the electronic pen 190 or the user's hand H in contact with the display 180 of the electronic whiteboard 1, the acceptance unit 12 accepts an input of a stroke movement (trajectory) (YES at S114), and the operation proceeds to S115. The image processing unit 16 generates stroke data (for example, coordinate data (x, y)) for displaying a stroke image on the two-dimensional display 180 based on the stroke input and accepted at the acceptance unit 12 (S115). The stroke data includes a stroke ID for identifying the stroke and information (parent) for identifying the page (page data) where the stroke (stroke image) is present. The display control unit 14 controls the display 180 of the electronic whiteboard 1 to display the stroke image based on the stroke data (S116). The drawing data of the stroke image being displayed is associated with the stroke data generated at S115, In this case, the display 180 displays a drawing screen including the background image and the stroke image.

On the other hand, when the acceptance unit 12 does not accept input of the stroke at S114 (NO at S114), the operation proceeds to S117. In this case, the display 180 displays a drawing screen including only the background image.

Next, the determination unit 15 determines whether the page displayed on the display 180 has changed (S117). For example, the determination unit 53 determines that the page has changed when the acceptance unit 12 accepts a request to generate a new page or when the display 180 displays a different background image. When the determination unit 15 determines that the page has not changed (NO at S117), the operation proceeds to S118. When the determination unit 15 determines that the page has changed (YES at S117), the operation from S112 is repeated to newly generate page information on the updated page.

Next, the determination unit 15 determines whether or not the conference has ended (S118). For example, the determination unit 15 determines that the conference has ended when the acceptance unit 12 receives a request to end the conference or when the electronic whiteboard 1 is powered off. When the determination unit 15 determines that the conference has not ended (NO at S118), the operation from S114 is repeated, and the conference using the displayed page is continued. On the other hand, when the determination unit 15 determines that the conference has ended (YES at S118), the operation ends.

As described above, during a conference being conducted at a particular site, the electronic whiteboard 1 generates the drawing screen information illustrated in FIG. 7 and displays the corresponding drawing screen on the display 180, to allow the user to draw a stroke while displaying a background image.

Referring now to FIGS. 12A to 12C, an example of a drawing screen, generated through processing of FIG. 11 and displayed at the electronic whiteboard 1, is described. The drawing screen 200A illustrated in FIG. 12A includes a background image v1 and a stroke image st1. The drawing screen 200B illustrated in FIG. 12B includes a stroke image st2. The drawing screen 200C illustrated in FIG. 12C includes a background image v3 and a stroke image st3. Further, the electronic whiteboard 1 manages screen data (background image data and stroke data) to be used for generating a drawing screen displayed on the display 180 as the drawing screen information illustrated in FIG. 7. For example, the drawing screen 200A illustrated in FIG. 12A is a drawing screen made up of the screen data of "page 1", the drawing screen 200B illustrated in FIG. 12B is a drawing screen made up of the screen data of "page 2", and the drawing screen 200C illustrated in FIG. 12C is a drawing screen made up of the screen data of "page 3".

As described above, the electronic whiteboard 1 is able to display a plurality of drawing screens as illustrated in FIGS. 12A to 12C. The drawing screens 200A to 200C illustrated in FIGS. 12A to 12C are examples of display screens displayed on the display 180.

Figure 13B:
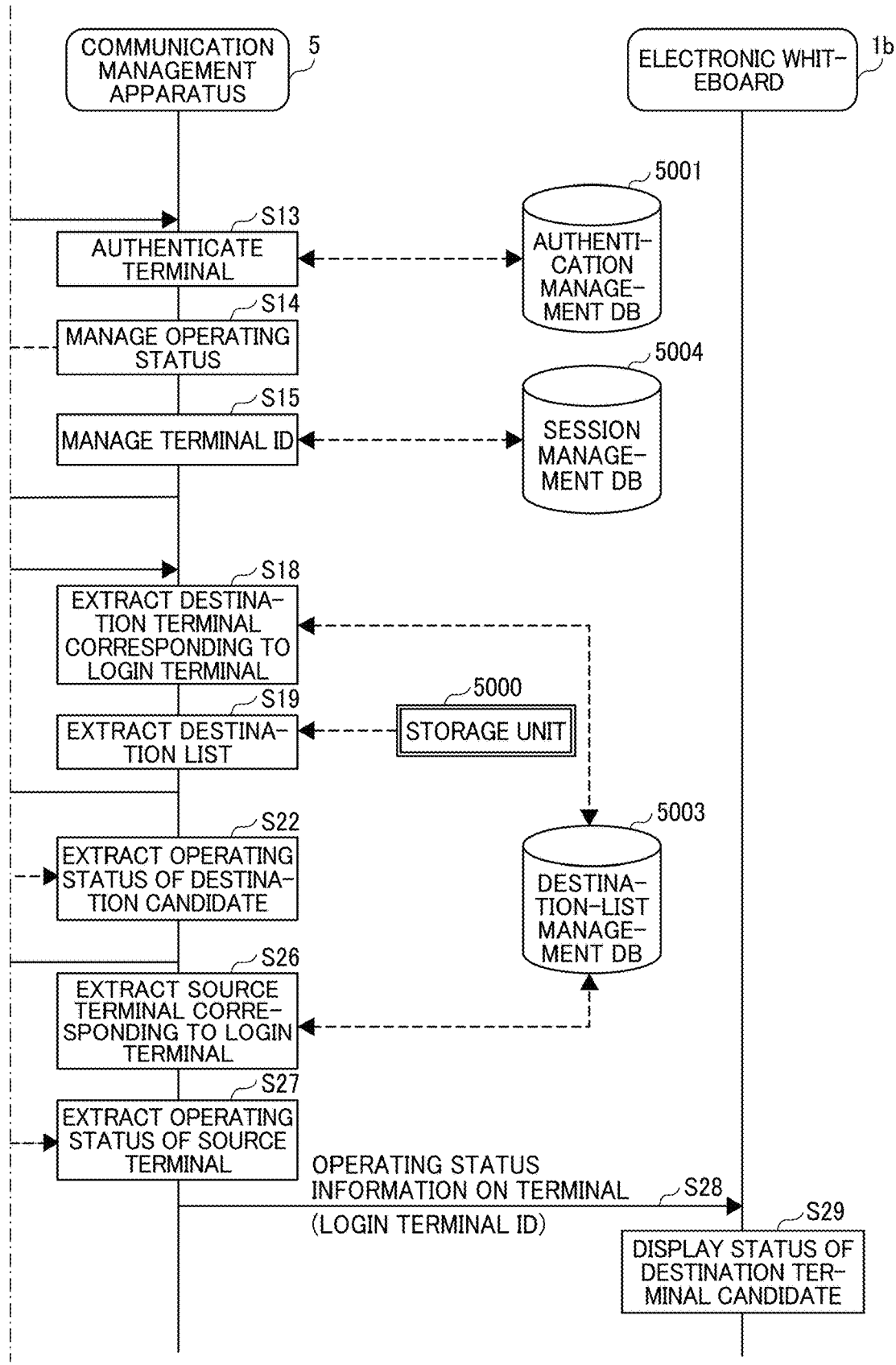

Operation of Preparing for Remote Communication:

First, a description is given of operation of preparing for remote communication, performed by the electronic whiteboard 1a as a login request sender terminal, with reference to FIGS. 13A and 13B and FIG. 14. FIGS. 13A and 13B are a sequence diagram illustrating operation for preparing to start remote communication between the electronic whiteboards. FIG. 14 is a diagram illustrating an example of a destination list screen displayed on the electronic whiteboard. The electronic whiteboard 1b performs login operation in the same or substantially the same manner as the electronic whiteboard 1a, and thus the redundant description thereof is omitted below.

As the power switch 122 of the electronic whiteboard 1a is turned on, the acceptance unit 12a accepts a request to turn on the power of the electronic whiteboard 1a (S11).

The sharing unit 11a transmits login request information indicating a request for login authentication to the communication management apparatus 5 through the communication network 100 (S12). The login request information includes the terminal ID of the electronic whiteboard 1a and the password. The terminal ID and the password are data that have been read via the storing/reading processing unit 19a from the storage unit 1000a and sent to the sharing unit 11a. In another example, a terminal ID and/or a password input by the user using an input device (input means) such as a keyboard may be transmitted. In still another example, a terminal ID and/or a password read from a storage medium such as a subscriber identity module (SIM) card or an SD card connected to the electronic whiteboard 1a may be transmitted. Thereby, the data exchange unit 51 of the communication management apparatus 5 receives the login request information transmitted from the electronic whiteboard 1a.

Next, the authentication unit 52 of the communication management apparatus 5 searches the authentication management table (FIG. 8A) using the terminal ID and the password included in the login request information received via the data exchange unit 51 as search keys. When the combination of the terminal ID and the password included in the login request information is registered in the authentication management table, the authentication unit 52 permits the login of the electronic whiteboard 1a (S13). Here, when the combination of the terminal ID and the password included in the login request information is registered in the authentication management table, operation subsequent to S14 is performed.

When the login of the electronic whiteboard 1a is allowed, the terminal management unit 54 updates information associated with the terminal ID "01aa" of the electronic whiteboard 1a in the terminal management table (FIG. 8B). For example, the terminal management unit 54 changes the operating status of the terminal ID "01aa" to "Online (Ready)" and updates the reception date and time to indicate the date and time when the login request information is received (S14). Here, the IP address of the communication terminal (electronic whiteboard) may not be the IP address that is previously registered, but may be the IP address that is transmitted from the electronic whiteboard 1a at S12. As illustrated in FIG. 8B, in the terminal management table, the terminal ID "01aa", the operating status "Online (Ready)", the reception date and time "2019.2.10.13:40", and the IP address "1.2.1.3" are stored in association with each other.

The storing/reading processing unit 55 adds a new record including the terminal ID "01aa" of the electronic whiteboard 1a received at S12 in the session management table as illustrated in FIG. 9B (S15). The data exchange unit 51 transmits the authentication result information indicating the authentication result obtained at S13 to the electronic whiteboard 1a that has sent the login request information through the communication network 100 (S16).

When the sharing unit 11a of the login request sender terminal (electronic whiteboard 1a) receives the authentication result indicating that login of the communication terminal (electronic whiteboard 1a) is permitted, the sharing unit 11a transmits destination list request information indicating a request for a destination list to the communication management apparatus 5 through the communication network 100 (S17). Accordingly, the data exchange unit 51 of the communication management apparatus 5 receives the destination list request information.

Next, the terminal management unit 54 searches the destination list management table (FIG. 9A) using the terminal ID "01aa" of the electronic whiteboard 1a (login request sender terminal) as a search key, and reads out the terminal ID of one or more destination terminal candidates that can communicate with the login request sender terminal (electronic whiteboard 1a). The terminal management unit 54 further reads out the destination name associated with the terminal ID of the one or more destination terminal candidates from the terminal management table (FIG. 8B) (S18). As a result, the terminal ID and terminal name of each of the destination terminal candidates corresponding to the terminal ID "01aa" of the login request sender terminal (electronic whiteboard 1a) are extracted.

Next, the data exchange unit 51 reads, for example, destination list frame data and icon data indicating the operating status from the storage unit 5000 through the storing/reading processing unit 59 (S19). The data exchange unit 51 transmits destination list information including the destination list frame and the icons being read, and the terminal IDs and the terminal names extracted at S18, to the login request sender terminal (electronic whiteboard 1a) (S20). Accordingly, the sharing unit 11a of the login request sender terminal (electronic whiteboard 1a) receives the destination list information. The storing/reading processing unit 19a stores the destination list information that is received in the storage unit 1000a (S21).

As described above, in the present embodiment, the communication management apparatus 5 centrally manages the destination list information of all terminals, instead of that each terminal manages the destination list information. For example, when a new electronic whiteboard 1 is added to the communication system, when a terminal already included in the communication system is replaced with a new model, or when appearance of the destination list frame is to be changed, since the communication management apparatus 5 according to the present embodiment centrally manages all destination candidates, time and efforts otherwise required for each terminal to change the destination list information can be saved.

The storing/reading processing unit 54 searches the terminal management table (FIG. 8B) using the terminal IDs of the destination terminal candidates read at S18 as search keys, to read the operating status associated with the terminal ID of each of the destination terminal candidates. By this searching, the terminal management unit 54 acquires the operating status of each electronic whiteboard 1 associated with the terminal ID of each destination terminal candidate (S22).

The data exchange unit 51 transmits terminal status information including the terminal IDs that are used as the search keys at S22 and the operation statuses of the corresponding destination terminals through the communication network 100 to the login request sender terminal (electronic whiteboard 1a) (S23).

Next, the storing/reading processing unit 19a of the login request sender terminal (electronic whiteboard 1a) successively stores the operation status information of the terminals received from the communication management apparatus 5 in the storage unit 1000a (S24). As a result, the login request sender terminal (electronic whiteboard 1a) acquires the operation status of the destination terminal candidate (electronic whiteboard 1b) that can communicate with the login request sender terminal (electronic whiteboard 1a).

Next, the display control unit 14a of the login request sender terminal (electronic whiteboard. 1a) generates a destination list reflecting the operation statuses of the destination terminal candidates based on the destination list information and the operation status information stored in the storage unit 1000a. Further, the display control unit 14a displays a destination list screen 800 as illustrated in FIG. 14 on the display 180 of the electronic whiteboard 1a using the destination list that is generated (S25). On the destination list screen 800, the icon indicating the operation status, the terminal ID, and the terminal name are displayed for each destination terminal candidate. In the example of FIG. 14, the icons representing the operation statuses of the communication terminals displayed from the top of the screen indicate the operation status "Offline", "Online (Ready)", and "Online (Ready)", The storing reading processing unit 54 of the communication management apparatus 5 searches the destination list management table (FIG. 9A) based on the terminal ID "01aa" of the login request sender terminal (electronic whiteboard 1a), to obtain the terminal IDs of other communication terminals that have registered the terminal ID "01aa" of the login request sender terminal (electronic whiteboard 1a) as the destination terminal candidate (S26). In the destination list management table illustrated in FIG. 9A, the terminal IDs of other terminals to be read at S26 are "01ab" "01ba", and "01ca".

The storing/reading processing unit 54 searches the terminal management table (FIG. 8B) based on the terminal ID "01aa" of the login request sender terminal (electronic whiteboard 1a), to acquire the operation status of the login request source terminal (electronic whiteboard 1a) (S27).

The data exchange unit 51 transmits the terminal status information including the terminal ID "01aa" of the login request sender terminal (electronic whiteboard 1a) and the terminal status information of the terminal having the operation status "Online" acquired at S27, to the communication terminal(s) whose operation status is "Online" in the terminal management table (FIG. 8B), from among the communication terminals identified by the terminal IDs extracted at S26 (S28). When the data exchange unit 51 transmits the terminal status information to the electronic whiteboard 1b, the IP address of the electronic whiteboard stored in the terminal management table (FIG. 8B) is referred to based on each terminal ID. Thus, the terminal ID "01aa" and the operation status "Online" of the login request sender terminal (electronic whiteboard 1a) are transmitted to each of the other destination terminals that can communicate with the login request sender terminal (electronic whiteboard 1a) as a destination terminal candidate. Accordingly, the operation status of the other destination terminal candidate is displayed on the destination terminal candidate (such as the electronic whiteboard 1b) (S29).

While the above-described processing describes the case in which the electronic whiteboard 1a is powered on, preparation for starting remote communication may be performed at any time, for example, right after the processing of FIG. 11. In such case, login processing and authentication processing may be omitted.

Figure 15:
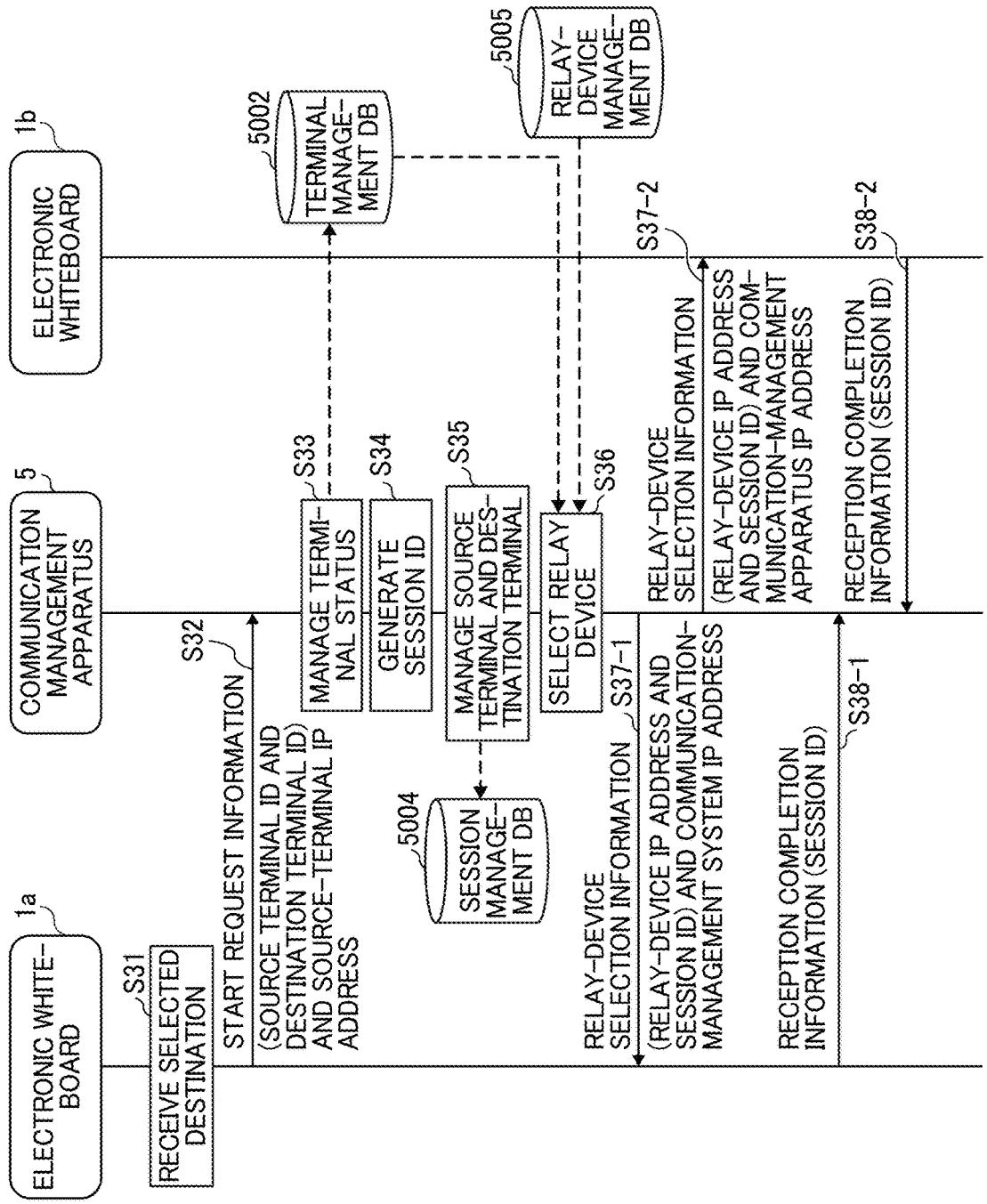
FIG. 15 is a sequence diagram illustrating an example operation of starting communication.

Operation of Starting Remote Communication:

A description is now given of operation in which the electronic whiteboard 1a starts remote communication with the electronic whiteboard 1b, with reference to FIG. 15. FIG. 15 is a sequence diagram illustrating an example operation of starting communication.

As the user A1 of a request source terminal (electronic whiteboard 1a) selects the electronic whiteboard 1b by selecting a destination terminal candidate (terminal ID "01ba") illustrated in FIG. 14, the acceptance unit 12a accepts a request to start communication with the selected destination terminal (electronic whiteboard 1b) (S31). The sharing unit 11a of the request source terminal (electronic whiteboard 1a) transmits start request information indicating a request for starting communication to the communication management apparatus 5 (S32). The start request information includes the terminal ID "01aa" of the request source terminal (electronic whiteboard. 1a) and the terminal ID "01ba" of the destination terminal (electronic whiteboard 1b). Accordingly, the data exchange unit 51 of the communication management apparatus 5 receives the start request information and the IP address of the request source terminal (electronic whiteboard 1a) from which the start request information is transmitted.

The storing/reading processing unit 54 updates the terminal management table (FIG. 8B) based on the terminal ID "01aa" of the request source terminal (electronic whiteboard 1a) and the terminal ID "01ba" of the destination terminal (electronic whiteboard 1b), included in the start request information. The storing/reading processing unit 54 updates the terminal management table (FIG. 9B), to change the operating statuses associated with the terminal IDs "01 aa" and "01ba" to "Online (Communicating)", based on the terminal ID "01 aa" of the request source terminal (electronic whiteboard 1a) and the terminal ID "01ba" of the destination terminal (electronic whiteboard 1b), included in the start request information. Although a session between the electronic whiteboard 1a (request source terminal) and the electronic whiteboard 1b (destination terminal) is not established, the operating status of each terminal is managed as communicating (S33): Accordingly, the request source terminal (electronic whiteboard 1a) and the destination terminal (electronic whiteboard 1b) have not started a videoconference but are in a communicating status. In such case, when a third electronic whiteboard electronic whiteboard 1c) tries to make a call with the request source terminal (electronic whiteboard 1a) or the destination terminal (electronic whiteboard 1b), a notification sound or display indicating a busy status is output.

Next, a description is given of operation of executing a session for selecting the relay device 3 to be used. The session management unit 55 of the communication management apparatus 5 generates a session ID for identifying a session, to be established between the electronic whiteboard 1a and the electronic whiteboard 1b (S34). In this embodiment, a description is given of an example case in which the session ID "se01" is generated.

The session management unit 55 stores the session ID "se01" generated at 534, the terminal ID "01aa" of the request source terminal (electronic whiteboard 1a), and the terminal ID "01ba" of the destination terminal (electronic whiteboard 1b) in association with each other in the session management table (FIG. 10B) (S35).

Next, the relay device management unit 56 selects the relay device 3 that relays data in the session between the request source terminal (electronic whiteboard 1a) and the destination terminal (electronic whiteboard 1b) (S36). For example, the relay device management unit 56 refers to the terminal management table (FIG. 8B) to determine the relay device IDs of the relay devices 3 each having the operating status "Online" in the relay device management table (FIG. 9C), and selects one of these relay devices 3 having an IP address closest to the IP address of the request source terminal (electronic whiteboard 1a). The following description is given of an example case where the relay device 3 identified by the relay device ID "111a" is selected.

When the relay device selection process at S36 is completed, the data exchange unit 51 of the communication management apparatus 5 transmits relay device selection information to the request source terminal (electronic whiteboard 1a) (S37-1). The relay device selection information includes the IP address of the relay device 3 selected at S36 and the session ID "se01" generated at S34. Further, the request source terminal (electronic whiteboard 1a) acquires the IP address of the communication management apparatus 5, which is the transmission source of the relay device selection information.

Similarly, the data exchange unit 51 of the communication management apparatus 5 transmits the relay device selection information to the destination terminal (electronic whiteboard 1b) (S37-2). The relay device selection information includes the IP address of the relay device 3 selected at S36, the terminal ID "01aa" of the request source terminal (electronic whiteboard 1a), and the session ID "se01" generated at S34. Thereby, the destination terminal (electronic whiteboard 1b) acquires the IP address of the communication management apparatus 5, which is the transmission source of the relay device selection information, in execution of a session with the session ID "se01".

In response to the process of S37-1, the sharing unit 11a of the request source terminal (electronic whiteboard 1a) transmits reception completion information indicating that the relay device selection information is received at S37-1 to the communication management apparatus 5 (S38-1). The reception completion information includes the session ID exchanged in the process of S37-1. Thereby, the communication management apparatus 5 acknowledges that the transmission of the relay device selection information, executed with the specific session ID "se01" has been completed.

In response to the process of S37-2, the destination terminal (electronic whiteboard 1b) also transmits the reception completion information indicating that the relay device selection information has been received through the process of S37-2 to the communication management apparatus 5 (S38-2). The communication management apparatus 5 acknowledges that the transmission of the relay device selection information, executed with the specific session ID "se01", has been completed.

Thus, the electronic whiteboard 1a and the electronic whiteboard 1b perform a video conference by exchanging site image data and audio data through the relay device 3 selected at S36.

Figure 16:
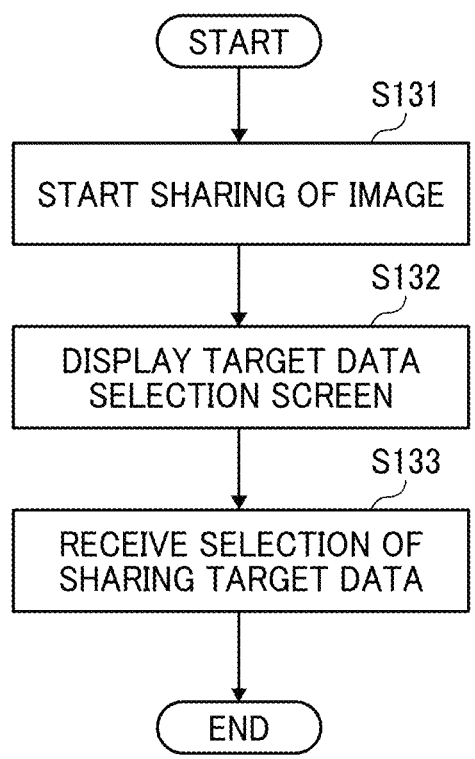
FIG. 16 is a flowchart illustrating example processing of selecting sharing target data, to be shared at the electronic whiteboard, according to the embodiment.
Figure 17:
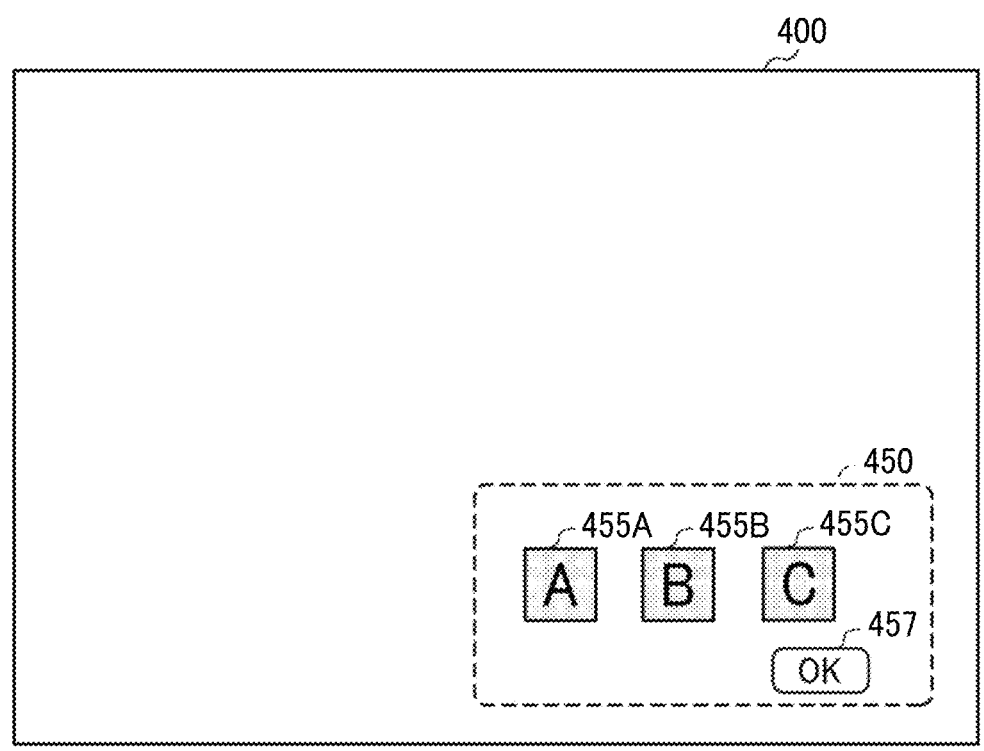
FIG. 17 is a diagram illustrating an example of a sharing target data selection screen displayed at the electronic whiteboard, according to the embodiment.
Figure 18:
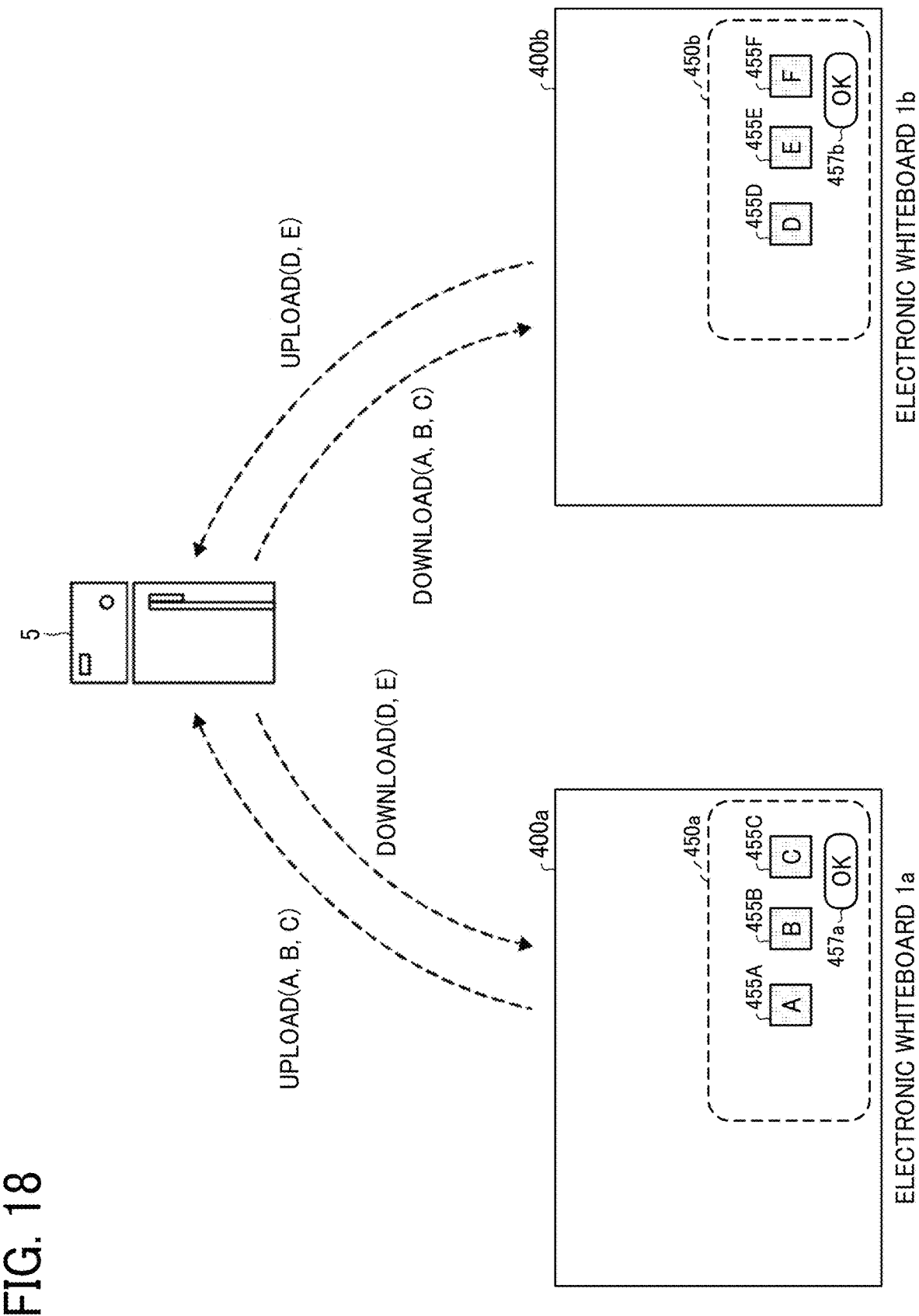
FIG. 18 is a sequence diagram illustrating an example operation of sharing data between electronic whiteboards in the communication system according to the embodiment.

Processing of sharing data to be shared:

Next, with reference to FIGS. 16 to 18, processing to start sharing of data between the electronic whiteboard 1a and the electronic whiteboard 1b using remote communication started by the above-described process is described. FIG. 16 is a flowchart illustrating example processing of selecting sharing target data, to be shared with other electronic whiteboard, at the electronic whiteboard, according to the embodiment. Although FIG. 16 illustrates processing performed by the electronic whiteboard 1a, similar processing may also be performed by the electronic whiteboard 1b that is a communication counterpart of the electronic whiteboard 1a.

First, the electronic whiteboard 1a starts processing of sharing an image of screen with the electronic whiteboard 1b as a remote communication counterpart. (S131). The electronic whiteboard 1a starts screen sharing processing, after a session is established between the communication terminals 1a and 1b. Specifically, the electronic whiteboard 1a starts screen sharing processing, for example, in response to transmission of information indicating completion of reception at S38-1 of FIG. 15 as a trigger. In this example, the electronic whiteboard 1a may start the screen sharing processing, for example, when the acceptance unit 12a receives a user selection via a predetermined selection screen displayed on the display 180.

At a start of the screen sharing processing, the display control unit 14a of the electronic whiteboard 1a controls the display 180 to display a sharing target data selection screen 400 for selecting the sharing target data (S132). FIG. 17 is a diagram illustrating an example of a sharing target data selection screen displayed at the electronic whiteboard, according to the embodiment. The sharing target data selection screen 400 of FIG. 17 includes a sharing target data selection area 450 for allowing a user A1 of the electronic whiteboard 1a to select data to be shared with the electronic whiteboard 1b, from among a plurality of items of screen data for a drawing screen having been generated at the electronic whiteboard 1a. In this example, the sharing target data selection area 450 includes selection icons 455 (455A to 455C) corresponding to respective drawing screens (screen data of drawing screen), and an "OK" button 457 to be pressed to start sharing of data with the electronic whiteboard 1b.

For example, the display control unit 14a refers to the drawing screen information management table of FIG. 10, to generate the selection icons 455 that correspond to a plurality of items of screen data of a drawing screen generated at the electronic whiteboard 1a, as described above referring to FIG. 11. That is, as described above referring to FIG. 11, the electronic whiteboard 1*a* stores, in its local memory, information on screen data of a drawing screen having been generated at the electronic whiteboard 1*a* in relation to a particular conference. In this example, it is assumed that the electronic whiteboard 1*a* generates drawing screens 200A, 200B, and 200C of FIGS. 12A, 12B, and 12C, in relation to the conference identified with the se01, before starting sharing of data with the electronic whiteboard 1*b*. In such case, the display control unit 14*a* displays the selection icons 455A to 455C. In particular, the selection icon 455A corresponds to the drawing screen 200A illustrated in FIG. 12A, the selection icon 455B corresponds to the drawing screen 200B illustrated in FIG. 12B, and the selection icon 455C corresponds to the drawing screen 200C illustrated in FIG. 12C.

Further, the sharing target data selection area 450 is displayed in reduced size, at a lower side of the sharing target data selection screen 400 displayed on the display 180, as illustrated in FIG. 17. As the sharing target data selection area 450 is reduced in size, any image of screen data displayed in the sharing target data selection area 450 is also displayed in reduced size. When the screen sharing processing starts, the display control unit 14*a* of the electronic whiteboard 1*a* switches from the drawing screen having been just displayed, to a blank screen (blank page). In addition, the sharing target data selection screen 400 in which the sharing target data selection area 450 is displayed in reduced size, is displayed on the display 180, as illustrated in FIG. 17. Any one of the sharing target data selection screen 400 and the sharing target data selection area 450 may have an appearance other than the one described above. For example, any of the selection screen 400 and the selection area 450 may be expressed, using such as animation to be easily understood by the user to improve UX (User Experience). In another example, the selection area 450 may be displayed in any portion of the selection screen 400.

When the user A1 presses the "OK" button 457 after selecting at least one of the selection icons 455 in the sharing target data selection area 450, the acceptance unit 12*a* accepts a selection of screen data to be shared with the electronic whiteboard 1*b*, as sharing target data (S133). The acceptance unit 12*a* may receive selection of one item of data corresponding to one selection icon 455, or may receive selection of plural items of data respectively corresponding to the plurality of selection icons 455. With this configuration, the user of the electronic whiteboard 1 shares only the data he/she wants to share with users of other electronic whiteboards, from among screen data of drawing screens having been already generated at the electronic whiteboard 1 when starting a remote conference.

Referring now to FIG. 18, processing of sharing data between the electronic whiteboard 1*a* and the electronic whiteboard 1*b* is described according to the embodiment. FIG. 18 is a diagram illustrating an example operation of sharing data between electronic whiteboards in the communication system according to the embodiment. In this example, screen data corresponding to the selection icons 455A to 455C displayed on a selection area 450*a* of a sharing target data selection screen 400*a* (as described above referring to FIG. 17) of the electronic whiteboard 1*a* are referred to as data A to data C, respectively. Further, screen data corresponding to selection icons 455D to 455F displayed on a selection area 450*b* of a sharing target data selection screen 400*h* displayed on the electronic whiteboard 1*b* are referred to as data. D to data F, respectively.

As illustrated in FIG. 18, at the electronic whiteboard 1*a*, data A, data B, and data C are selected as sharing target data from the sharing target data selection screen 400*a*, as described above referring to FIG. 16. The electronic whiteboard 1*a* uploads the sharing target data, that is, the data A, the data B, and the data C, which are selected, to the communication management apparatus 5. Then, the counterpart electronic whiteboard 1*b* downloads the data A, the data B, and the data C uploaded by the electronic whiteboard 1*a* from the communication management apparatus 5. For example, the communication management apparatus 5 may cause the electronic whiteboard 1*b* to download the data A, the data B, and the data C, or may transmit the data A, the data B, and the data C to the electronic whiteboard 1*b*.

The electronic whiteboard 1*b* may store, in its local memory, the data A, the data B, and the data C that are downloaded at least temporarily. For example, as described above below referring to FIGS. 19 and 20, the electronic whiteboard 1*b* stores information on the downloaded data, in the drawing screen information management table of FIG. 10.

In this example, it is assumed that the electronic whiteboard 1*b* has already generated a drawing screen made up of screen data, specifically, the data D, the data E, and the data F, for example, in a substantially similar manner as described above referring to FIG. 11. The acceptance unit 12*b* of the electronic whiteboard 1*b* accepts a selection of the data D and the data E as the sharing target data, in a substantially similar manner as described above referring to FIG. 16. The electronic whiteboard 1*b* uploads the data D and the data E, which are selected, to the communication management apparatus 5. Then, the electronic whiteboard 1*a* downloads the data D and the data. E uploaded by the electronic whiteboard 1*b* from the communication management apparatus 5. The electronic whiteboard 1*a* may store, in its local memory, the data D and the data E that are downloaded at least temporarily. For example, as described below referring to FIGS. 19 and 20, the electronic whiteboard 1*a* stores information on the downloaded data, in the drawing screen information management table of FIG. 10.

With this configuration, the communication system allows sharing of screen data corresponding to drawing screen having been already generated at each electronic whiteboard (communication terminal) at the start of the remote conference, between the electronic whiteboard 1*a* and the electronic whiteboard 1*b*. Further, the communication system allows selection of data to be shared with other party, at each of the electronic whiteboard 1*a* and the electronic whiteboard 1*b*, such that only the data that the user wants to share in the remote conference is shared.

Sharing of Data between Electronic Whiteboards:

Referring to FIGS. 19 to 22, processing of sharing data between a plurality of electronic whiteboards 1 is described according to the embodiment. FIGS. 19 to 22 are sequence diagrams illustrating an example operation of sharing data between electronic whiteboards in the communication system according to the embodiment. In the present embodiment, the electronic whiteboard 1*a* and the electronic whiteboard 1*b* share data, such as the background image data and the stroke data. Here, a case where the background image and the stroke image displayed on the electronic whiteboard 1*a* are also displayed on the electronic whiteboard 1*b* is described. The processing is performed in a substantially similar manner for a case where the background image and the stroke image displayed on the electronic whiteboard 1*b* are displayed on the electronic whiteboard 1*a*.

Figure 19:
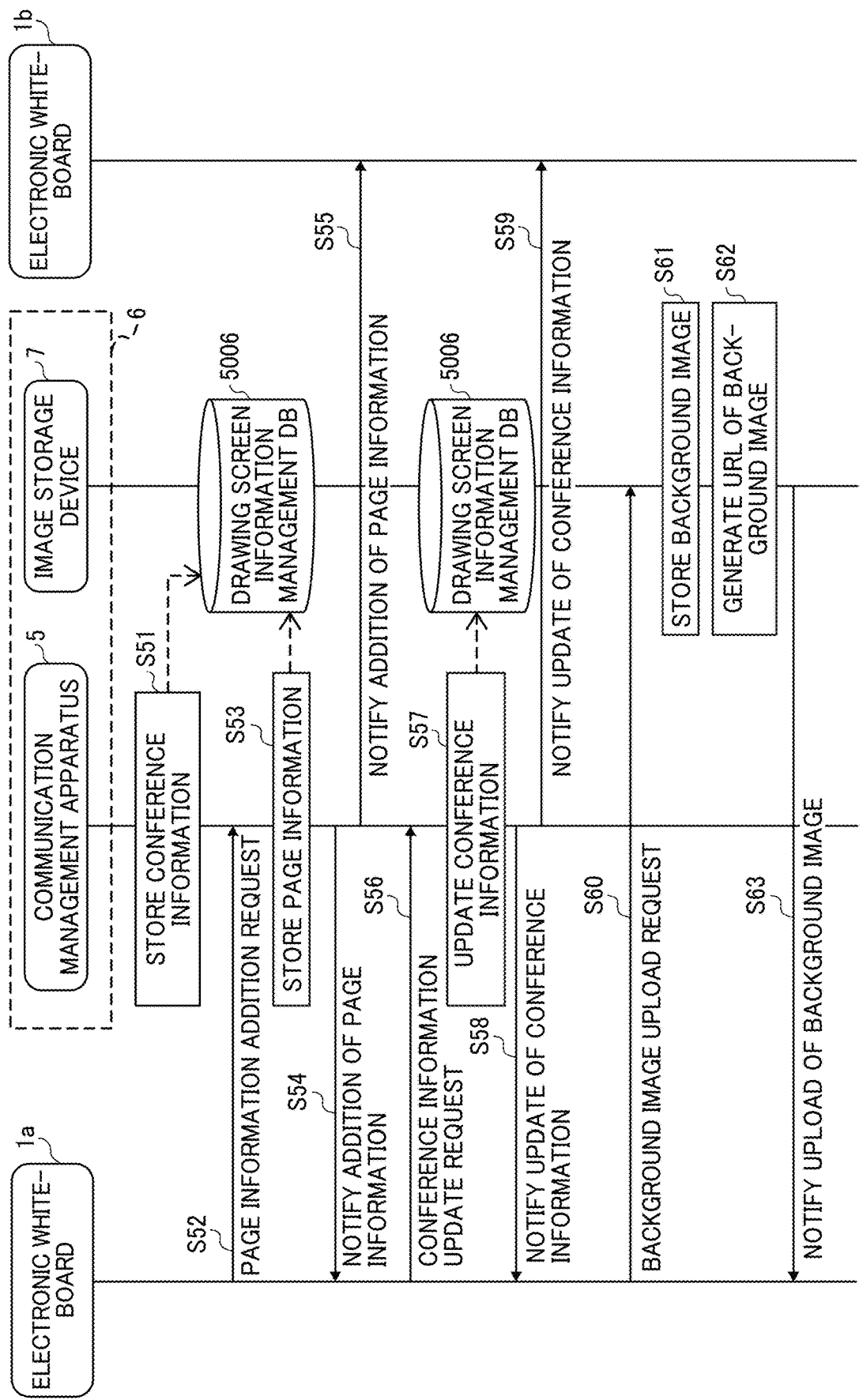
FIG. 19 is a sequence diagram illustrating an example operation of sharing data between electronic whiteboards in the communication system according to the embodiment.
Figure 20:
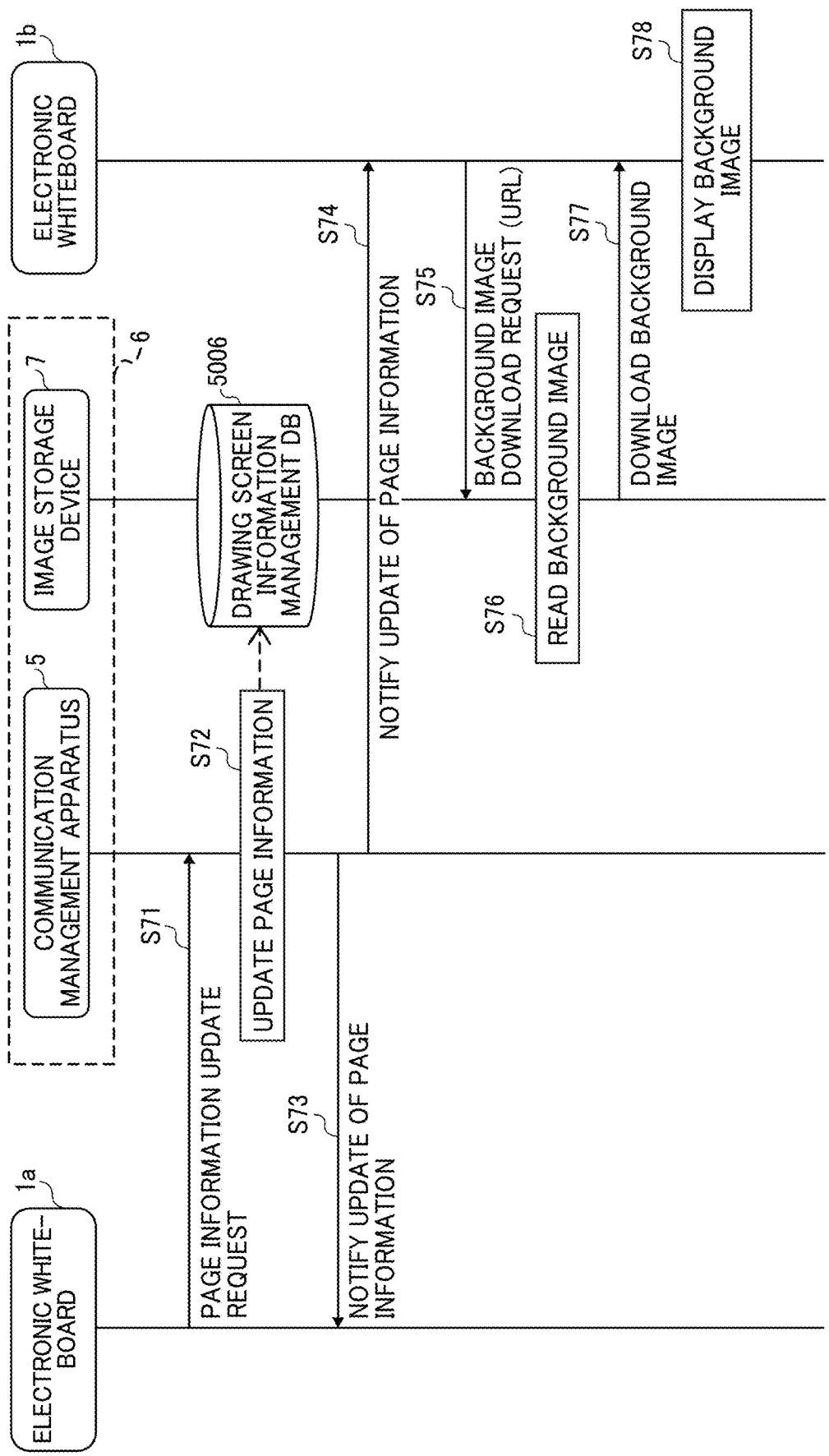
FIG. 20 is a sequence diagram illustrating an example operation of sharing data between electronic whiteboards in the communication system according to the embodiment.

The drawing screen management unit 57 of the communication management apparatus 5 receives the reception completion information from each electronic whiteboard 1 through S38-1 and S38-2 of FIG. 15. Further, the screen data to be initially shared is selected as described above referring to FIG. 16. The processing of FIGS. 19 and 20 are thus performed to share data having been selected through processing of FIG. 16, such that at least one of the selected data is initially displayed at each electronic whiteboard.

The drawing screen management unit 57 stores, in the drawing screen information management DB 5006 (FIG. 10), conference information on the remote conference to be started (S51), Specifically, the drawing screen management unit 57 stores the session ID included in the received reception completion information as the conference ID. The drawing screen management unit 57 assigns a gid corresponding to the remote conference to be started.

Next, the sharing unit 11a of the electronic whiteboard 1a transmits a page information addition request that requests addition of page information to the communication management apparatus 5 (S52). This page information addition request includes a page ID for identifying a page for which addition is requested, and information (parent) for identifying a conference being conducted at the electronic whiteboard 1a. The data exchange unit 51 of the communication management apparatus 5 receives the page information addition request from the electronic whiteboard 1a.

Next, the drawing screen management unit 57 causes the drawing screen information management DB 5006 (FIG. 11) to store various information received at S52 as page information (S53). The drawing screen management unit 57 also assigns a gid corresponding to the page (page data) to be stored in the drawing screen information management DB 5006.

The data exchange unit 51 transmits, to the electronic whiteboard 1a, a page information addition notification indicating that the page information is added to the drawing screen information management DB 5006 (S54). This page information addition notification includes a page ID for identifying the added page information (parent) for identifying a conference being conducted at the electronic whiteboard 1a, and information on gid numbered by the drawing screen management unit 57. Accordingly, the sharing unit 11a of the electronic whiteboard 1a receives the page information addition notification transmitted from the communication management apparatus 5, Further, the data exchange unit 51 transmits a page information addition notification to the electronic whiteboard 1b as a counterpart terminal (S55). The information included in the page information addition notification is the same as the information transmitted to the electronic whiteboard 1a at S54. Accordingly, the sharing unit 11b of the electronic whiteboard 1b receives the page information addition notification transmitted from the communication management apparatus 5.

Subsequently, the sharing unit 11a of the electronic whiteboard 1a transmits a conference information update request indicating update of the conference information to the communication management apparatus 5 (S56). The conference information update request includes the gid of the conference information requested to be updated, the conference ID for identifying the conference being conducted at the electronic whiteboard 1a, the information (children) indicating the page generated in the conference, and information (current page) the page currently displayed on the electronic whiteboard 1a. The data exchange unit 51 of the communication management apparatus 5 receives the conference information update request from the electronic whiteboard 1a.

Next, the drawing screen management unit 57 updates the conference information stored in the drawing screen information management DB 5006 (FIG. 11) based on various information received at S56 (S57). In this case, the drawing screen management unit 57 searches the drawing screen information management table to update the information (body) associated with the conference ID received at the data exchange unit 51. In addition, the drawing screen management unit 57 updates the gid of the conference information received at S56.

The data exchange unit 51 transmits a conference information update notification indicating that the conference information has been updated to the electronic whiteboard 1a (S58). The conference information update notification includes the gid updated at S57, the conference ID for identifying the conference being conducted at the electronic whiteboard the information (children) indicating the page generated in the conference, and the information (current page) on a page currently displayed on the electronic whiteboard 1a. Accordingly, the sharing unit 11a of the electronic whiteboard 1a receives the conference information update notification transmitted from the communication management apparatus 5. Further, the data exchange unit 51 transmits a conference information update notification to the electronic whiteboard 1b as a counterpart terminal (S59). The information included in this conference information update notification is the same as the information transmitted to the electronic whiteboard 1a at S58. Accordingly, the sharing unit 11b of the electronic whiteboard 1b receives the conference information update notification transmitted from the communication management apparatus 5.

The sharing unit 11a of the electronic whiteboard 1a transmits an upload request of the background image data to the image storage device 7 (S60). In this case, the data exchange unit 51 transmits the background image data to, for example, a predetermined URL (for example, "http://xxx.jp/upload") for upload. Thereby, the data exchange unit 71 of the image storage device 7 receives the upload request from the electronic whiteboard 1a. The storing/reading processing unit 79 of the image storage device 7 stores the background image data received at S60 in the storage unit 7000 (S61). Further, the generation unit 73 generates a URL indicating the storage location of the background image data stored at S61 (S62). The URL is an example of storage location information. In another example, the storage location information includes a URI. The data exchange unit 71 transmits an upload completion notification indicating that uploading of the background image data is completed to the electronic whiteboard 1a (S63). This upload completion notification includes the URL generated at S62. Accordingly, the sharing unit 11a of the electronic whiteboard 1a receives the upload completion notification transmitted from the image storage device 7, Referring to FIGS. 20 and 21, processing to be performed after the background image data is uploaded from the electronic whiteboard 1a to the image storage device 7 is described according to the embodiment First, referring to FIG. 20, processing to be performed when the electronic whiteboard 1a has transmitted the page information addition request at S52 is described as an example.

As illustrated in FIG. 20, the sharing unit 11a of the electronic whiteboard 1a transmits, to the communication management apparatus 5, a page information update request requesting update of page information (S71). The page information update request includes the page IL) for identifying the page, the information (parent) for identifying a conference being conducted at the electronic whiteboard 1a, the gid of the page received at S54 and the URL information received at S63. The data exchange unit 51 of the communication management apparatus 5 receives the page information update request from the electronic whiteboard 1a.

Next, the drawing screen management unit 57 updates the page information stored in the drawing screen information management DB 5006 (FIG. 11) based on various information received at S71 (S72). Specifically, the drawing screen management unit 57 searches the drawing screen information management table to update the information (body) associated with the page ID received at S71. In addition, the drawing screen management unit 57 updates the gid of the page information received at S71.

The data exchange unit 51 of the communication management apparatus 5 transmits a page information update notification indicating that the page information has been updated to the electronic whiteboard 1a (S73). The page information update notification includes the page ID for identifying the page, the information (parent) for identifying a conference being conducted at the electronic whiteboard 1a, the gid of the page updated at S72, and the URL information of the background image data. Accordingly, the sharing unit 11a of the electronic whiteboard 1a receives the page information addition notification transmitted from the communication management apparatus 5. Further, the data exchange unit 51 of the communication management apparatus 5 transmits a page information update notification to the electronic whiteboard 1b as a counterpart terminal (S74). The information included in the page information update notification is the same as the information transmitted to the electronic whiteboard 1a at S73. Accordingly, the sharing unit 11b of the electronic whiteboard 1b receives the page information update notification transmitted from the communication management apparatus 5.

The sharing unit 11b of the electronic whiteboard 1b transmits a download request that requests downloading of the background image data, to the URL received at S74, which indicates the storage location at the image storage device 7 (S75). Thereby, the data exchange unit 71 of the image storage device 7 receives the download request from the electronic whiteboard 1c.

Next, the storing/reading processing unit 79 of the image storage device 7 reads the requested background image data from the storage unit 7000 based on the URL indicated by the download request received at the data exchange unit 71 (S76). The data exchange unit 71 transmits the requested background image data to the electronic whiteboard 1b as the request source terminal (S77). Thereby, the sharing unit 11b of the electronic whiteboard 1b downloads (receives) the background image data. The display control unit 14b of the electronic whiteboard 1b controls the display 180 to display the background image based on the background image data downloaded (received) at the sharing unit 11b (S78), Next, referring to FIG. 21, processing to be performed when the electronic whiteboard 1a has not transmitted the page information addition request at S52 to the communication management apparatus 5 is described as an example.

Figure 21:
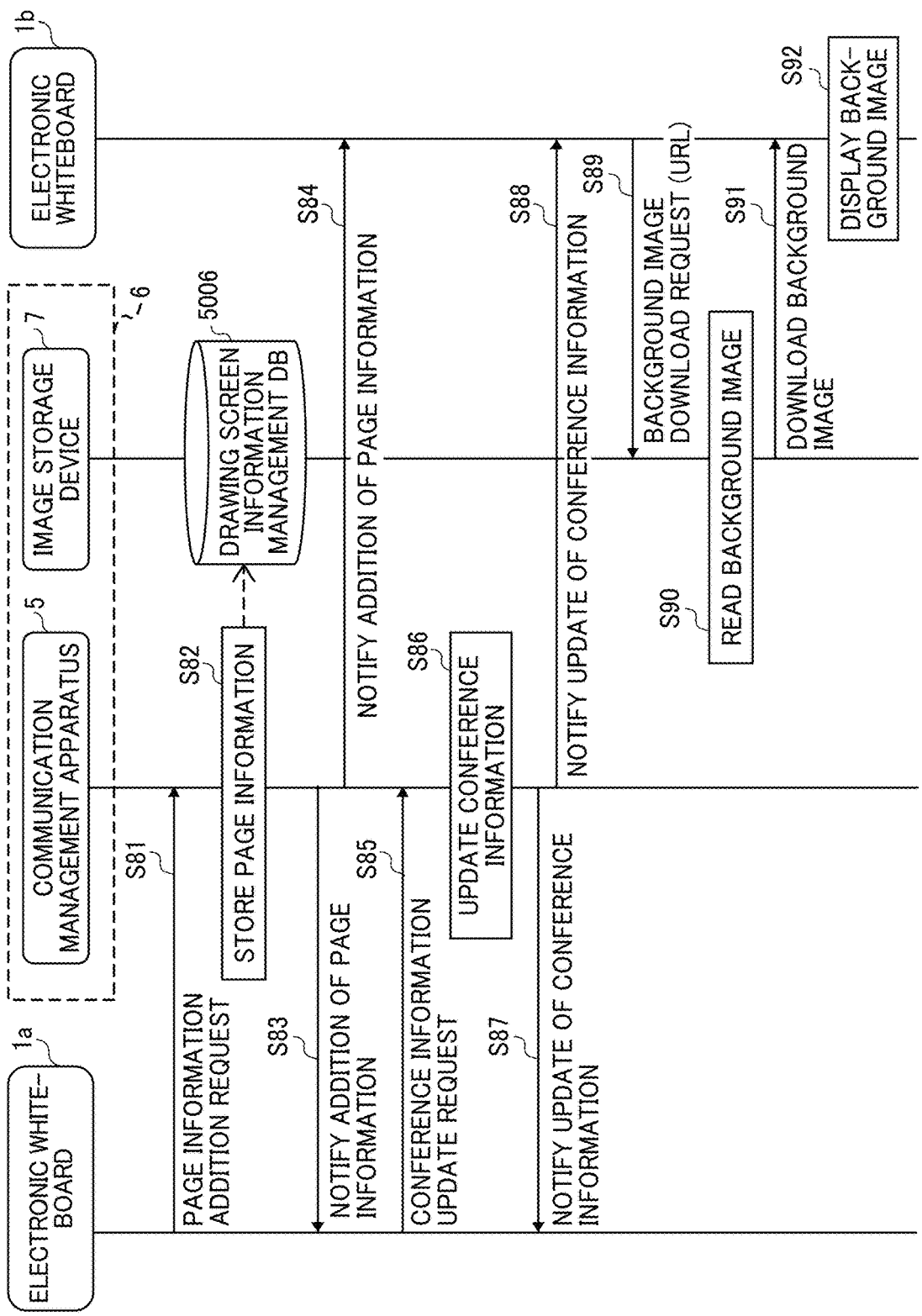
FIG. 21 is a sequence diagram illustrating an example operation of sharing data between electronic whiteboards in the communication system according to the embodiment.

As illustrated in FIG. 21, the sharing unit 11a of the electronic whiteboard 1a transmits, to the communication management apparatus 5, a page information addition request requesting addition of page information (S81). This page information addition request includes a page ID for identifying the page for which addition is requested, information (parent) for identifying a conference being conducted at the electronic whiteboard 1a, and information on the URL of the background image data received at S63. The data exchange unit 51 of the communication management apparatus 5 receives the page information addition request from the electronic whiteboard 1a.

Next, the drawing screen management unit 57 causes the drawing screen information management DB 5006 (FIG. 11) to store various information received at S81 as page information (S82). The drawing screen management unit 57 also assigns a gid corresponding to the page (page data) to be stored in the drawing screen information management DB 5006.

The data exchange unit 51 transmits, to the electronic whiteboard 1a, a page information addition notification indicating that the page information is added to the drawing screen information management DB 5006 (S83). This page information addition notification includes a page ID for identifying the added page, information (parent) for identifying a conference being conducted at the electronic whiteboard 1a, information on gid numbered by the drawing screen management unit 57, and URL information of the background image data. Accordingly, the sharing unit 11a of the electronic whiteboard 1a receives the page information addition notification transmitted from the communication management apparatus 5. Further, the data exchange unit 51 transmits a page information addition notification to the electronic whiteboard 1b as a counterpart terminal (S84). The information included in the page information addition notification is the same as the information transmitted to the electronic whiteboard 1a at S83. Accordingly, the sharing unit 11b of the electronic whiteboard 1b receives the page information addition notification transmitted from the communication management apparatus 5.

Subsequently, the sharing unit 11a of the electronic whiteboard 1a transmits a conference information update request indicating update of the conference information to the communication management apparatus 5 (S85). The conference information update request includes the gid of the conference information requested to be updated, the conference ID for identifying the conference being conducted at the electronic whiteboard 1a, the information (children) indicating the page generated in the conference, and information (current page) on the page currently displayed on the electronic whiteboard 1a. The data exchange unit 51 of the communication management apparatus 5 receives the conference information update request from the electronic whiteboard 1a.

Next, the drawing screen management unit 57 updates the conference information stored in the drawing screen information management DB 5006 (FIG. 11) based on various information received at S85 (S86). In this case, the drawing screen management unit 57 searches the drawing screen information management table to update the information (body) associated with the conference ID received at the data exchange unit 51. In addition, the drawing screen management unit 57 updates the gid of the conference information received at S85.

The data exchange unit 51 transmits a conference information update notification indicating that the conference information has been updated to the electronic whiteboard 1a (S87). The conference information update notification includes the gid updated at S56, the conference ID for identifying the conference being conducted at the electronic whiteboard 1a, the information (children) indicating the page generated in the conference, and the information (current page) on a page currently displayed on the electronic whiteboard 1a. Accordingly, the sharing unit 11a of the electronic whiteboard 1a receives the conference information update notification transmitted from the communication management apparatus 5, Further, the data exchange unit 51 transmits a conference information update notification to the electronic whiteboard 1*b* as a counterpart terminal (S88). The information included in this conference information update notification is the same as the information transmitted to the electronic whiteboard 1*a* at S87. Accordingly, the sharing unit 11*b* of the electronic whiteboard 1*b* receives the conference information update notification transmitted from the communication management apparatus 5. Processing from S89 to S92 are performed in the same or substantially the same manner as S75 to S78 described above with reference to FIG. 20, and thus redundant descriptions thereof are omitted below.

Figure 22:
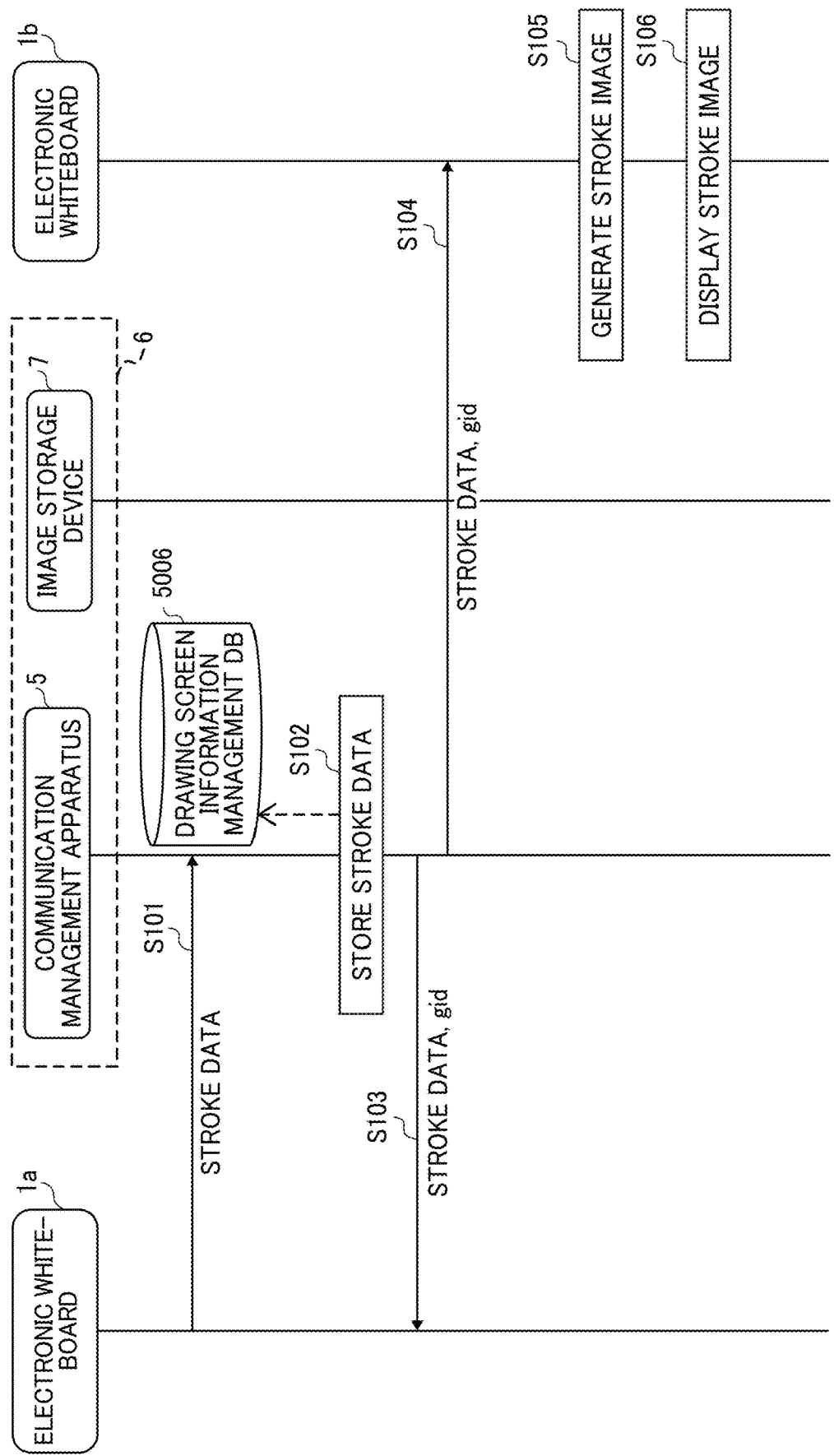
FIG. 22 is a sequence diagram illustrating an example operation of sharing data between electronic whiteboards in the communication system according to the embodiment.

Referring to FIG. 22, processing of sharing data generated by the electronic whiteboard 1*a* with the electronic whiteboard 1*b* is described according to the embodiment. The sharing unit 11*a* of the electronic whiteboard 1*a* transmits stroke data generated by the image processing unit 16*a* to the communication management apparatus 5 (S101). Thereby, the data exchange unit 51 of the communication management apparatus 5 receives the stroke data transmitted from the electronic whiteboard 1*a*. The drawing screen management unit 57 stores the stroke data received at S101 in the drawing screen information management DB 5006 (FIG. 11) (S102). In this case, as illustrated in FIG. 11, the drawing screen management unit 57 stores, in the stroke data information management table, items of the stroke data received by the data exchange unit 51*a* in the order of occurrence (sequence order) in association with the conference ID (the session ID) of a session with which the remote conference is conducted. Further, the drawing screen management unit 57 assigns a specific number to the gid, associated with the stroke data received at S102.

Next, the data exchange unit 51 transmits the stroke data stored at S102 and the gid having the number assigned by the drawing screen management unit 57, to the electronic whiteboard 1*a* (S103). Accordingly, the electronic whiteboard 1*a* receives the stroke data and the gid transmitted from the communication management apparatus 5. That is, the electronic whiteboard 1*a* is informed of the accepted stroke data and the numbered gid.

The data exchange unit 51 transmits the stroke data and the gid to the electronic whiteboard 1*b*, which is the counterpart terminal (S104). Accordingly, the sharing unit 11*b* of the electronic whiteboard 1*b* receives the stroke data and the gid transmitted from the communication management apparatus 5. Then, the image processing unit 16*b* of the electronic whiteboard 1*b* generates a stroke image based on the stroke data received at the sharing unit 11*b* (S105). Then, the display control unit 14*b* controls the display 180 of the electronic whiteboard 1*b* to display the stroke image generated at S105 (S106). Accordingly, the communication system allows sharing of the stroke image drawn on the electronic whiteboard 1*a* with the electronic whiteboard 1*b*.

Accordingly, the electronic whiteboard 1*a* and the electronic whiteboard 1*b* can share the stroke image and the background image displayed on the display 180. The background image data of the background image displayed on the electronic whiteboard 1*a* is uploaded to the image storage device 7, and is then downloaded to the electronic whiteboard 1*b*. Further, stroke data of strokes drawn on the electronic whiteboard 1*a* is shared with the electronic whiteboard 1*b* via the communication management apparatus 5. The background image data sharing process described referring to FIGS. 19 to 21 and the stroke data sharing process described referring to S101 to S106 of FIG. 22 may be performed in any order other than the above-described order, or may be performed concurrently.

In this manner, through repeating processing illustrated in FIGS. 19 to 20, the electronic whiteboard 1*a* is able to share screen data to be shared, which is selected using the sharing target selection screen 400 illustrated in FIG. 17, with the electronic whiteboard 1*b*, at a start of processing to share data. Further, when a plurality of items of screen data are selected as sharing target data, the electronic whiteboard 1*a* preferentially displays screen data corresponding to the drawing screen displayed immediately before executing the screen sharing processing. The screen data corresponding to the drawing screen displayed immediately before executing the screen sharing processing, corresponds to the screen data of "current page" included in the conference information. Accordingly, the electronic whiteboard 1*a* can preferentially display the drawing screen corresponding to the topic having been discussed just before sharing of data starts, with the electronic whiteboard 1*b*, such that the sharing of data can be smoothly started.

Figure 23:
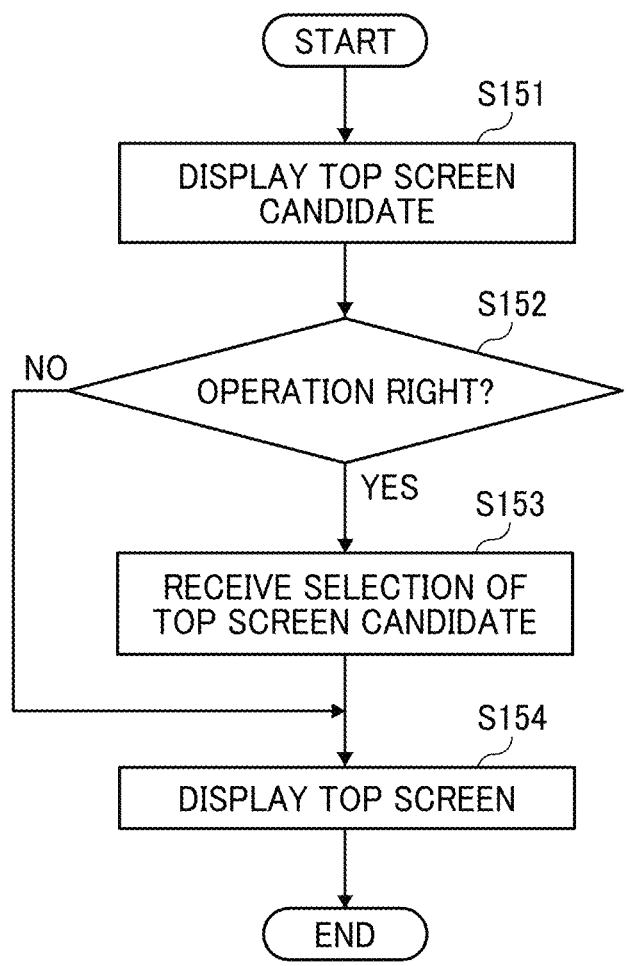
FIG. 23 is a flowchart illustrating example processing of selecting a top screen at the electronic whiteboard, according to the embodiment.
Figure 24:
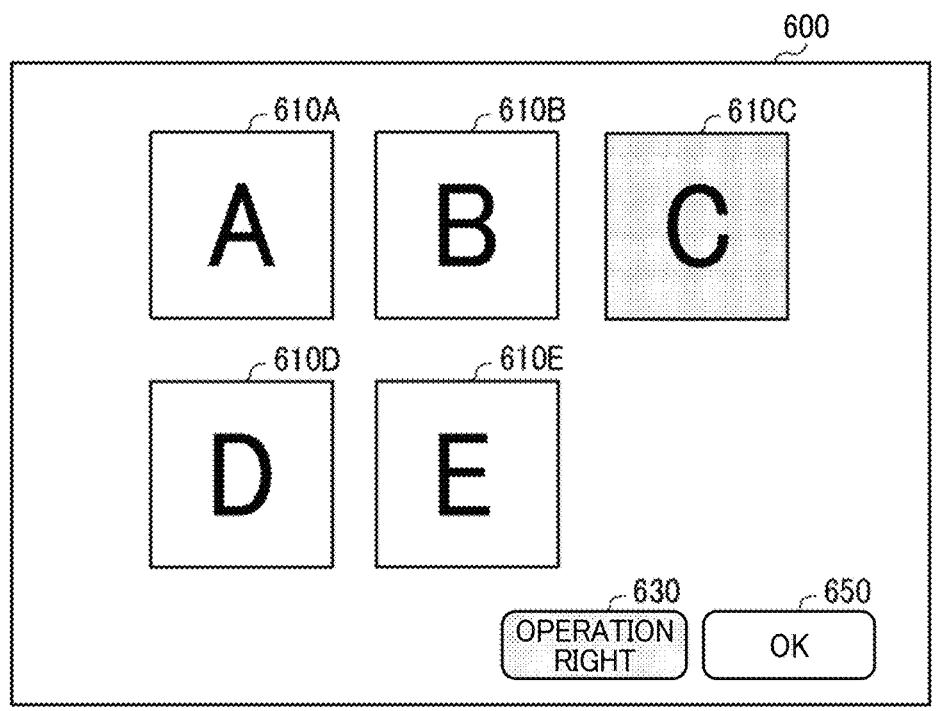
FIG. 24 is a diagram illustrating an example of a top screen candidate selection screen displayed at the electronic whiteboard, according to the embodiment.
Figure 25:
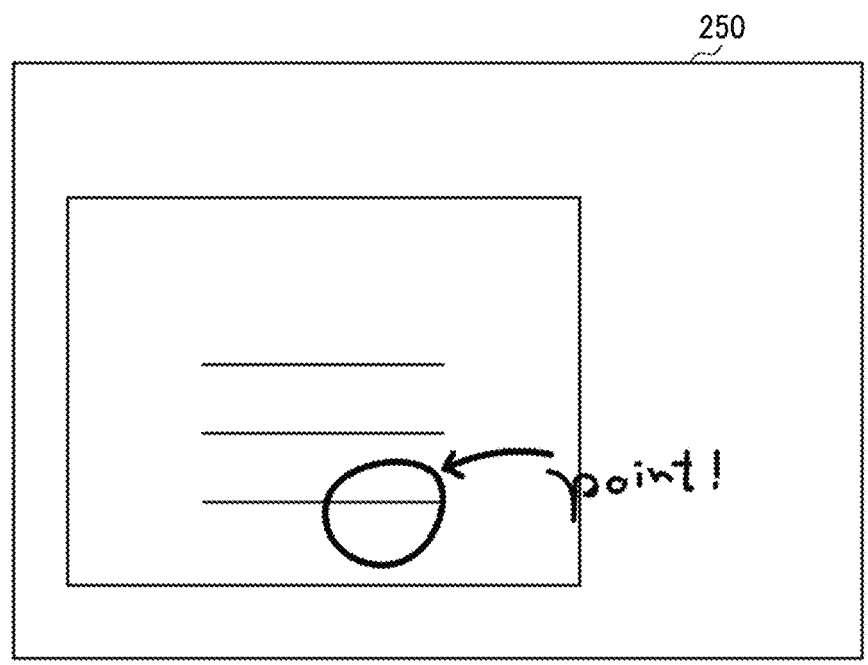
FIG. 25 is a diagram illustrating an example of a top screen displayed at the electronic whiteboard, according to the embodiment.

Processing of Selecting Top Screen:

Next, referring to FIGS. 23 to 25, processing of selecting a top screen to be initially displayed on each electronic whiteboard 1 in the remote conference, from among data shared between the electronic whiteboard 1*a* and the electronic whiteboard 1*b*, is described according to the embodiment. FIG. 23 is a flowchart illustrating example processing of selecting a top screen at the electronic whiteboard. In the following example, it is assumed that each of the data (data A to data E) illustrated in FIG. 18 is shared between the electronic whiteboard 1*a* and the electronic whiteboard 1*b*. Although FIG. 23 illustrates processing to be performed by the electronic whiteboard 1*a*, the same processing may be performed by the electronic whiteboard 1*b* as a communication counterpart.

First, the display control unit 14*a* of the electronic whiteboard 1*a* causes the display 180 to display a top screen candidate selection screen 600 for selecting a top screen, which is a drawing screen to be firstly displayed (S151). FIG. 24 is a diagram illustrating an example of a top screen candidate selection screen displayed at the electronic whiteboard, according to the embodiment. The top screen candidate selection screen 600 illustrated in FIG. 24 includes a plurality of selection icons 610 (610A to 610E), corresponding to sharing target data (data A to data C) selected using the sharing target data selection screen 400 in FIG. 17, and screen data (data D and data E) received at the sharing unit 11*a* from the electronic whiteboard 1*b*. Specifically, the selection icons 610A to 610C correspond to the sharing target data (data A to data C) selected using the sharing target data selection screen 400, and the selection icons 610D and 610E are the screen data (data D and data. E) transmitted from the electronic whiteboard 1*b*. The top screen candidate selection screen 600 further includes an operation right change button 630 to be pressed to change a user with an operation right for selecting a top screen, and an "OK" button 650 to be pressed to determine the top screen. The operation right indicates whether the user has a right, or authority, to select a top screen.

The operation right for selecting the top screen can be changed by the user selecting the operation right change button 630. At the electronic whiteboard 1 of the user having the operation right. "operation right YES" indicating that the user has the operation right is displayed. At the electronic whiteboard 1 of the user without the operation right, "operation right NO" indicating that the user has no operation right is displayed. As a default setting, the operation right is given to a request source terminal (for example, the electronic whiteboard 1*a*) that has requested sharing of data with other electronic whiteboard 1 or starting of remote communication (remote conference), or the user operating the request source terminal. As described above, the communication system restricts an electronic whiteboard (communication terminal) that can have the operation right to select the top screen, so as to avoid any conflict that may be caused by allowing selection of a top screen from different electronic whiteboards. The top screen candidate selection screen 600 may have an appearance other than the one described above. For example, any part of the top screen candidate selection screen 600 may be expressed, using such as animation to be easily understood by the user to improve UX (User Experience).

Next, the determination unit 15a determines whether or not the user at the electronic whiteboard 1 has the operation right for selecting the top screen (S152). When the determination unit 15a determines that the user has the operation right (YES at S152), the operation proceeds to S153. When the determination unit 15a determines that the user does not have the operation right (NO at S152), the operation proceeds to S154. In the example of FIG. 24, the electronic whiteboard 1a, which is a request source terminal, is determined to have the operation right.

Next, when the user A1 presses the "OK" button 650 after selecting at least one of the selection icons 610 included in the top screen candidate selection screen 600, the acceptance unit 12a receives the selection of the top screen candidate (S153). In the example of FIG. 24, the selection icon 610C is selected by the user A1, and the acceptance unit 12a receives the selection of the drawing screen 200C as a top screen candidate to be displayed.

Then, the display control unit 14a controls the display 180 to display a drawing screen corresponding to the top screen candidate selected at S153, as a top screen 250. FIG. 25 is a diagram illustrating an example of a top screen displayed at the electronic whiteboard, according to the embodiment. The top screen 250 illustrated in FIG. 25 is the same as the drawing screen 200C corresponding to the selection icon 610C selected from the top screen candidate selection screen 600 illustrated in FIG. 24. This top screen 250 is also shared and displayed at the electronic whiteboard 1b.

As described above, when a plurality of items of screen data is shared with the electronic whiteboard 1b, the electronic whiteboard 1a allows the user A1 to select the screen data of the top screen 250, which is a drawing screen to be initially displayed, from among a plurality of items of screen data that are shared. Accordingly, the user is able to start a remote conference smoothly using a desired drawing screen.

As described above, the electronic whiteboard 1a according to one or more embodiments is an example of communication terminal that shares data with the communication terminal 1b (an example of other communication terminal). The electronic whiteboard 1a receives a selection of sharing target data, which is data to be shared with the electronic whiteboard 1b, from among one or more items of screen data of a drawing screen (an example of a display screen) having been generated at the electronic whiteboard 1a. The electronic whiteboard 1a shares the screen data, selected as the sharing target data, with the electronic whiteboard 1b. With this configuration, the electronic whiteboard 1a selects data according to an instruction from the user A1, from among one or more items of screen data having been generated before starting sharing of data with the electronic whiteboard 1b, to share only the selected data with the electronic whiteboard 1b to display as a display screen. This facilitates a smooth start of the remote conference.

According to one or more embodiments, the electronic whiteboard 1a (an example of a communication terminal) receives sharing target data of the other communication terminal, that is, screen data selected from among one or more items of screen data generated at the electronic whiteboard 1b (an example of other communication terminal), and causes the display 180 (an example of displaying unit) to display the top screen candidate selection screen 600 including the sharing target data of the other communication terminal and the sharing target data of the communication terminal. The electronic whiteboard 1a receives a selection of screen data of a drawing screen (an example of display screen) to be shared with the electronic whiteboard 1b (an example of other communication terminal) for display at the display 180, from among screen data in the top screen candidate selection screen 600. The electronic whiteboard 1a causes the display 180 to display a drawing screen made up of the selected screen data as a top screen 250. As described above, when a plurality of items of screen data is shared with the electronic whiteboard 1b, the electronic whiteboard 1a allows the user A1 to select the screen data of the top screen 250, which is a display screen to be firstly displayed, from among shared screen data. Accordingly, the user is able to start a remote conference smoothly using a desired display screen.

Further, according to one example, the operation right for selecting the top screen 250 is given to a request source terminal that has requested to start sharing of data. For example, the electronic whiteboard 1a, as the request source terminal, receives a selection of screen data, from among data illustrated in the top screen candidate selection screen 600, to be displayed as the top screen 250. By restricting an electronic whiteboard (communication terminal) that can have the operation right to select the top screen 250, the electronic whiteboard 1a can avoid any conflict that may be otherwise caused by allowing the electronic whiteboard 1b to select a top screen.

According to one or more embodiments, when starting sharing of data with the electronic whiteboard 1b (an example of other electronic whiteboard), the electronic whiteboard 1a (an example of a communication terminal) controls the display 180 (an example of a displaying unit) to display a sharing target data selection screen 400 that displays a plurality of items of screen data of a drawing screen (an example of a display screen) having been generated at the electronic whiteboard 1a. The electronic whiteboard 1a further receives a selection of sharing target data, from among the plurality of items of screen data being displayed in the sharing target data selection screen 400. With this configuration, the user of the electronic whiteboard 1a shares only the data he/she wants to share with users of other electronic whiteboards, from among screen data of drawing screens having been already generated at the electronic whiteboard 1a when starting a remote conference.

Further, according to one or more embodiments, the electronic whiteboard 1a (an example of a communication terminal) preferentially shares screen data that is used for displaying a drawing screen (an example of a display screen), currently displayed on the display 180 (an example of a displaying unit), from among screen data as sharing target data that is received. Accordingly, the electronic whiteboard 1a can preferentially share the drawing screen corresponding to the topic having been discussed just before sharing of data is started, with the electronic whiteboard 1b, such that the remote conference can be smoothly started.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), and field programmable gate array (FPGA), and conventional circuit components arranged to perform the recited functions.

Further, various tables of any one of the above-described embodiments may be generated by machine learning. Further, data of associated items can be classified, such that use of tables can be optional. In the present disclosure, machine learning is a technique that enables a computer to acquire human-like learning ability. Machine learning refers to a technology in which a computer autonomously generates an algorithm required for determination such as data identification from learning data loaded in advance, and applies the generated algorithm to new data to make a prediction. Any suitable learning method is applied for machine learning, for example, any one of supervised learning, unsupervised learning, semi-supervised learning, reinforcement learning, and deep learning, or a combination of two or more those learning.

Although the communication terminal, the communication system, the data sharing method, and the program according to embodiments of the present invention are described above, the above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A communication terminal comprising circuitry configured to:
    receive a selection of screen data, from among one or more items of screen data, as sharing target data to be shared with another communication terminal, each screen data to be used for generating a display screen and having been generated at the communication terminal;
    share the sharing target data with the other communication terminal;
    receive sharing target data of the other communication terminal, the sharing target data of the other communication terminal being selected from among one or more items of screen data, each screen data to be used for generating a display screen and having been generated at the other communication terminal;
    control a display to display a display screen generated based on particular screen data, the particular screen data being one of the sharing target data of the communication terminal and the sharing target data of the other communication terminal;
    receive selection of the particular screen data, from among the sharing target data of the communication terminal and the sharing target data of the other communication terminal;
    control a display to display the display screen based on the particular screen data, as a top screen to be initially displayed at a start of sharing of data with the other communication terminal;
    control the display to display a selection screen including the sharing target data of the communication terminal and the sharing target data of the other communication terminal, for allowing a user to select the particular screen data as a candidate of the top screen;
    determine whether the communication terminal or the user operating the communication terminal has a right to select the top screen; and
    receive the selection of the particular screen data as the top screen based on a determination that the communication terminal or the user operating the communication terminal has a right to select the top screen.

2. The communication terminal of claim 1, wherein the circuitry is further configured to transmit the sharing target data to the other communication terminal, via a server that manages data to be shared with the other communication terminal.

3. The communication terminal of claim 1, wherein the right to select the top screen is assigned to the communication terminal or the user operating the communication terminal, in a case that the communication terminal requests to start sharing of data with the other communication terminal.

4. The communication terminal of claim 1, wherein the circuitry is configured to
    at a start of sharing of data with the other communication terminal, control the display to display a sharing target data selection screen that displays the one or more items of screen data having been generated at the communication terminal, and
    receive the selection of screen data from the one or more items of screen data via the sharing target data selection screen.

5. The communication terminal of claim 4, wherein the sharing target data selection screen displays a reduced-size image of a display screen based on the screen data.

6. The communication terminal of claim 1, wherein, when a plurality of items of screen data is selected as the sharing target data of the communication terminal,
    the circuitry is configured to share with priority, the screen data used for generating a display screen being currently displayed at the display of the communication terminal, such that the screen data of the currently-displayed display screen is initially displayed at the other communication terminal.

7. The communication terminal of claim 1, wherein the screen data includes stroke data used for displaying a stroke image contained in the display screen.

8. The communication terminal of claim 1, wherein the screen data includes background image data of a background image contained in the display screen.

9. A communication system comprising:
    a first communication terminal; and
    a second communication terminal configured to share data with the first communication terminal,
    the first communication terminal including first circuitry configured to:
    receive selection of screen data, from among one or more items of screen data, as first sharing target data to be shared with the second communication terminal, each screen data to be used for generating a display screen and having been generated at the first communication terminal;
    share the first sharing target data with the second communication terminal;
    receive second sharing target data of the second communication terminal, the second sharing target data of the second communication terminal being selected from among one or more items of screen data, each screen data to be used for generating a display screen and having been generated at the second communication terminal;

control a display to display a display screen generated based on particular screen data, the particular screen data being one of the first sharing target data of the first communication terminal and the second sharing target data of the second communication terminal;

receive selection of the particular screen data, from among the first sharing target data of the first communication terminal and the second sharing target data of the second communication terminal;

control a display to display the display screen based on the particular screen data, as a top screen to be initially displayed at a start of sharing of data with the second communication terminal;

control the display to display a selection screen including the first sharing target data of the first communication terminal and the second sharing target data of the second communication terminal, for allowing a user to select the particular screen data as a candidate of the top screen;

determine whether the first communication terminal or the user operating the first communication terminal has a right to select the top screen; and receive the selection of the particular screen data as the top screen based on a determination that the first communication terminal or the user operating the first communication terminal has a right to select the top screen, the second communication terminal including second circuitry configured to:

receive selection of screen data, from among one or more items of screen data, as third sharing target data to be shared with the first communication terminal, each screen data to be used for generating a display screen and having been generated at the second communication terminal; and share the third sharing target data with the first communication terminal.

10. The communication system of claim 9, wherein
the first circuitry and the second circuitry are each configured to control a corresponding display to display a display screen generated based on particular screen data, the particular screen data being one of the first sharing target data of the first communication terminal and the third sharing target data of the second communication terminal.

11. A method of sharing data between a first communication terminal and a second communication terminal, the method comprising:

at the first communication terminal, receiving selection of screen data, from among one or more items of screen data, as sharing target data to be shared with a second communication terminal, each screen data to be used for generating a display screen and having been generated at the first communication terminal;

sharing the sharing target data of the first communication terminal with the second communication terminal;

receiving sharing target data of the second communication terminal, the sharing target data of the second communication terminal being selected from among one or more items of screen data, each screen data to be used for generating a display screen and having been generated at the second communication terminal;

controlling a display to display a display screen generated based on particular screen data, the particular screen data being one of the sharing target data of the first communication terminal and the sharing target data of the second communication terminal;

receiving selection of the particular screen data, from among the sharing target data of the first communication terminal and the sharing target data of the second communication terminal;

controlling a display to display the display screen based on the particular screen data, as a top screen to be initially displayed at a start of sharing of data with the second communication terminal;

controlling the display to display a selection screen including the sharing target data of the first communication terminal and the sharing target data of the second communication terminal, for allowing a user to select the particular screen data as a candidate of the top screen;

determining whether the first communication terminal or the user operating the first communication terminal has a right to select the top screen; and receiving the selection of the particular screen data as the top screen based on a determination that the first communication terminal or the user operating the first communication terminal has a right to select the top screen.

12. The method of claim 11, further comprising:
at the second communication terminal, receiving selection of screen data, from among one or more items of screen data, as sharing target data to be shared with the first communication terminal, each screen data to be used for generating a display screen and having been generated at the second communication terminal; and sharing the sharing target data of the second communication terminal with the first communication terminal.

13. The communication terminal of claim 1, wherein the screen data includes stroke data used for displaying a stroke image contained in the display screen and background image data of a background image contained in the display screen.

* * * * *